US009557026B2

(12) United States Patent
Nakano et al.

(10) Patent No.: US 9,557,026 B2
(45) Date of Patent: Jan. 31, 2017

(54) VEHICULAR LIGHTING INSTRUMENT SEMICONDUCTOR LIGHT SOURCE LIGHT SOURCE UNIT AND VEHICULAR LIGHTING INSTRUMENT

(71) Applicant: ICHIKOH INDUSTRIES, LTD., Isehara-shi, Kanagawa-ken (JP)

(72) Inventors: Katsuaki Nakano, Isehara (JP); Yuki Yamamoto, Isehara (JP); Daisuke Takamura, Isehara (JP); Kenji Matsuoka, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 277 days.

(21) Appl. No.: 14/374,773

(22) PCT Filed: May 29, 2013

(86) PCT No.: PCT/JP2013/064915
§ 371 (c)(1),
(2) Date: Jul. 25, 2014

(87) PCT Pub. No.: WO2013/180178
PCT Pub. Date: Dec. 5, 2013

(65) Prior Publication Data

US 2015/0016136 A1 Jan. 15, 2015

(30) Foreign Application Priority Data

May 29, 2012 (JP) ................................ 2012-121842
May 29, 2012 (JP) ................................ 2012-121843
May 29, 2012 (JP) ................................ 2012-122424

(51) Int. Cl.
*B60Q 1/00* (2006.01)
*F21S 8/10* (2006.01)

(52) U.S. Cl.
CPC ............ *F21S 48/212* (2013.01); *F21S 48/215* (2013.01); *F21S 48/328* (2013.01)

(58) Field of Classification Search
CPC ......... F21S 48/212; F21S 48/20; F21S 48/215
See application file for complete search history.

(56) References Cited

U.S. PATENT DOCUMENTS 7,621,667 B2 11/2009 Behr et al.
7,806,562 B2 10/2010 Behr et al.
(Continued)

FOREIGN PATENT DOCUMENTS

CN 101087977 A 10/2007
DE 10 2004 062 989 A1 7/2006
(Continued)

OTHER PUBLICATIONS

Chinese Office Action dated Mar. 24, 2016 as issued in corresponding Chinese Application No. 201380028229.X and its English translation thereof.
(Continued)

*Primary Examiner* — Evan Dzierzynski
(74) *Attorney, Agent, or Firm* — Foley & Lardner LLP

(57) ABSTRACT

[Problem]
To attain weight saving or the like of a light source unit.
[Means for Solving the Problem]
The present invention includes a light source portion 10 and a socket portion 11. The socket portion 11 is an integrated structural part which is composed of an insulation member 7, a thermo conductive resin member 8, and electric power feeding members 91 to 93. As a result, according to the present invention, the thermo conductive resin member 8 is used as a heat radiation member to radiate to the outside a heat which is generated at the light source portion 10 and thus it is possible to save the weight of the light source unit
(Continued)

1, save manufacturing costs, and improve durability of a die in comparison with that of a conventional die cast.

18 Claims, 20 Drawing Sheets

(56) References Cited

U.S. PATENT DOCUMENTS

| | | | | |
|---|---|---|---|---|
| 8,262,256 | B2 | 9/2012 | Biebl et al. | |
| 2003/0063477 | A1* | 4/2003 | Stepanenko | B29C 45/14811 362/546 |
| 2008/0117647 | A1 | 5/2008 | Behr et al. | |
| 2008/0130308 | A1 | 6/2008 | Behr et al. | |
| 2009/0122566 | A1* | 5/2009 | Cunningham | B60Q 1/2696 362/487 |
| 2009/0296416 | A1 | 12/2009 | Luo et al. | |
| 2010/0084761 | A1* | 4/2010 | Shinagawa | H01L 23/3128 257/706 |
| 2010/0128479 | A1 | 5/2010 | Biebl et al. | |
| 2012/0026747 | A1* | 2/2012 | Hayashi | F21S 48/212 362/520 |
| 2012/0120675 | A1* | 5/2012 | Cozzi | H01R 33/09 362/549 |

FOREIGN PATENT DOCUMENTS

| | | | |
|---|---|---|---|
| DE | 10 2009 022 723 | A1 | 12/2009 |
| EP | 2 228 595 | A2 | 9/2010 |
| EP | 2 413 023 | A2 | 2/2012 |
| EP | 2 434 206 | A2 | 3/2012 |
| JP | 63-005581 | A | 1/1998 |
| JP | 2003-187609 | A | 7/2003 |
| JP | 2010-524210 | A | 7/2010 |
| JP | 4608553 | B2 | 1/2011 |
| JP | 2011-061157 | A | 3/2011 |
| JP | 4778523 | B2 | 9/2011 |
| JP | 2012-038691 | A | 2/2012 |
| JP | 2012-043750 | A | 3/2012 |
| JP | 2012-084280 | A | 4/2012 |

OTHER PUBLICATIONS

Japanese Office Action dated Feb. 16, 2016 as issued in corresponding Japanese Application No. 2012-121842 and its English translation thereof.

Japanese Office Action dated Feb. 16, 2016 as issued in corresponding Japanese Application No. 2012-121843 and its English translation thereof.

Japanese Office Action dated Feb. 16, 2016 as issued in corresponding Japanese Application No. 2012-122424 and its English translation thereof.

* cited by examiner

VEHICULAR LIGHTING INSTRUMENT SEMICONDUCTOR LIGHT SOURCE LIGHT SOURCE UNIT AND VEHICULAR LIGHTING INSTRUMENT

TECHNICAL FIELD

The present invention relates to a vehicular lighting instrument semiconductor light source light source unit. Also, the present invention relates to a vehicular lighting instrument which employs a semiconductor light source as a light source.

BACKGROUND ART

A light source unit of such type is conventionally known (for example, Patent Literature 1 and Patent Literature 2). Hereinafter, a conventional light source unit will be described. The conventional light source unit is provided with: a light emitting diode; and a coolant for cooling the light emitting diode, the coolant being formed as an aluminum die cast portion.

CITATION LIST

Patent Literature

| | |
|---|---|
| [Patent Literature 1] | Japanese Patent No. 4608553 |
| [Patent Literature 2] | Japanese Patent No. 4778523 |

SUMMARY OF THE INVENTION

Problems to be Solved by the Invention

In so far as the conventional light source unit is concerned, a coolant is formed as an aluminum die cast portion and thus the light source unit is prone to increase in weight, manufacturing costs are also high, and further, there is a problem associated with durability of a die.

A problem to be solved by the present invention is to reduce the weight of the light source unit, save the manufacturing costs, and improve the durability of the die.

Means for Solving the Problem

A vehicular lighting instrument semiconductor light source light source unit according to first aspect of present invention, comprising: a light source portion; and a socket portion to which the light source portion is mounted, wherein the light source portion having a light emitting chip of a semiconductor light source, the socket portion is comprised of: a thermo conductive resin member to radiate to an outside a heat which is generated at the light source portion; an electric power feeding member electrically connected to the light source portion, feeding electric power to the light source portion; and an insulation member to sheath at least a part of the electric power feeding member, and incorporate the thermo conductive resin member and the electric power feeding member in a state in which the members are insulated from each other.

According to another aspect of the present invention, a metallic body is provided at a site corresponding to the light source portion of the thermo conductive resin member.

According to another aspect of the present invention, a fine irregularities are provided on a face coming into contact with at least the thermo conductive resin member of the metallic body, and the metallic body is insert molded in the thermo conductive resin member.

According to another aspect of the present invention, the thermo conductive resin member is comprised of an insert molded article of a thermo conductive resin.

According to another aspect of the present invention, the metallic body is secured in a state in which the metallic body comes into intimate contact with the thermo conductive resin member via a thermo conductive medium.

According to another aspect of the present invention, a fin portion and a gap which are positioned in a perpendicular direction are provided at the thermo conductive resin member when a vehicular lighting instrument provided with a light source unit is provided in a vehicle.

According to another aspect of the present invention, a power supply side connector portion comprised of a part of the thermo conductive resin member and a part of the electric power feeding member is provided at the socket portion, a fin portion which is positioned in a perpendicular direction and a gap which opens at an upper part thereof are disposed at an upper part of the connector portion, when a vehicular lighting instrument provided with a light source unit is provided in a vehicle, and a fin portion which is positioned in a perpendicular direction and a vertically penetrating gap are disposed at a side part of the connector portion, when a vehicular lighting instrument provided with a light source unit provided in a vehicle.

According to another aspect of the present invention, the thermo conductive resin member forms an exterior portion of the socket portion, and a mounting portion for providing a light source unit in a vehicular lighting instrument is provided at the thermo conductive resin member.

According to another aspect of the present invention, the thermo conductive resin member forms an exterior portion of the socket portion, and fine irregularities are provided on an exterior face of the thermo conductive resin member.

According to another aspect of the present invention, the thermo conductive resin member is comprised of an insert molded article of a thermo conductive resin, and a flow direction of the thermo conductive resin and a heat transmission direction are substantially coincident with each other.

According to another aspect of the present invention, a top plate portion having the light source portion mounted to one face thereof is provided at the thermo conductive resin member, on the other face of the top plate portion of the thermo conductive resin member, a plurality of fin portions and gaps which are positioned in a perpendicular direction are provided when a vehicular lighting instrument provided with a light source unit is provided in a vehicle, a gate of a molding die at a time of insert molding the thermo conductive resin member is positioned at or near a center of an opposite face to a side to which the light source portion is mounted, a light source side connector portion comprised of a part of the thermo conductive resin member and a part of the electric power feeding member is provided at the socket portion, and a portion communicating with the connector portion is clipped from the fin portion at which the gate is positioned.

According to another aspect of the present invention, a top plate portion having the light source portion on one face thereof is provided at the thermo conductive resin member, on the other face of the top plate portion of the thermo conductive resin member, a fin portion and a gap which are positioned in a perpendicular direction are provided when a vehicular lighting instrument provided with a light source unit is provided in a vehicle, a circular ring-shaped protective wall surrounding the light source portion is provided on one face of the top plate portion of the thermo conductive resin member, and the gate of the molding die at the time of insert molding of the thermo conductive resin member is positioned at a respective one of two sites on one straight line or one substantially straight line on an end face of the protection wall.

According to another aspect of the present invention, a top plate portion having the light source portion on one face thereof is provided at the thermo conductive resin member, on the other face of the top plate portion of the thermo conductive resin member, a fin portion and a gap which are positioned in a perpendicular direction are provided when a vehicular lighting instrument provided with a light source unit is provided in a vehicle, a mounting portion for providing a light source unit in a vehicular lighting instrument is provided at the thermo conductive resin member, and the gate of the molding die at the time of insert molding of the thermo conductive resin member is positioned at a respective one of two sites on one straight line or one substantially straight line of an end face of the mounting portion.

According to another aspect of the present invention, a top plate portion having the light source portion on one face thereof is provided at the thermo conductive resin member, and a metallic body is provided at the top plate portion.

According to another aspect of the present invention, the socket portion further comprises a metallic body which is molded separately from the thermo conductive resin member, which is secured to the thermo conductive resin member, and with which the light source portion is brought into intimate contact.

According to another aspect of the present invention, an avoidance recessed portion to avoid the electric power feeding member is provided at an outer circumferential edge of the metallic body, a plurality of securing portions which are swaged at an outer circumferential edge other than the avoidance recessed portion of the metallic body, and which secures the metallic body, are provided at the thermo conductive resin member, and on at least either one of a securing face of the thermo conductive resin member and a securing face of the metallic body to secure each other, a groove is provided in a circumferential shape which is smaller than an outer circumferential edge of the metallic body.

According to another aspect of the present invention, at the thermo conductive resin member and the metallic body, positioning portions to determine a mutual position are respectively provided.

According to another aspect of the present invention, a vehicular lighting instrument which employs a semiconductor light source as a light source, comprising: a lamp housing and a lamp lens to partition a lamp room; and the vehicular lighting instrument semiconductor light source light source unit according to the first aspect, which is disposed in the lamp room.

Effect of the Invention

In so far as a vehicular lighting instrument semiconductor light source light source unit of the present invention and the vehicular lighting instrument of the present invention is concerned, a thermo conductive resin member is used as a heat radiation member to radiate a heat which is generated at a light source portion to the outside and thus it is possible to reduce the weight of the light source unit, save the manufacturing costs, and improve the durability of a die in comparison with that of a conventional aluminum die cast.

In so far as a vehicular lighting instrument semiconductor light source light source unit of the present invention and the vehicular lighting instrument of the present invention is concerned, a thermo conductive resin member is composed of an insert molded article of a thermo conductive resin, and the flow of the thermo conductive resin and a heat transmission direction are substantially coincident with each other. As a result, a heat which is generated at a light source portion can be efficiently radiated from the thermo conductive resin member to the outside and thus a heat radiation effect which is substantially equal to or more than a heat radiation effect of a conventional die cast can be achieved. In this manner, downsizing of the thermo conductive resin member and a downsizing of a light source unit can be attained.

In so far as the vehicular lighting instrument semiconductor light source light source unit of the present invention and the vehicular lighting instrument of the present invention are concerned, a socket portion is composed of a thermo conductive resin member and a metallic body which is secured to the thermo conductive resin member, and a light source portion is mounted to a socket portion in a state in which the light source portion comes into intimate contact with the metallic body. As a result, a heat which is generated at the light source portion can be efficiently transmitted to the thermo conductive resin member via the metallic body and thus a heat radiation effect which is substantially equal to or more than a heat radiation effect of the conventional aluminum die cast can be achieved. In this manner, downsizing of the thermo conductive resin member, that is, downsizing of the light source unit can be attained.

In so far as the vehicular lighting instrument semiconductor light source light source unit of the present invention and the vehicular lighting instrument of the present invention are concerned, a thermo conductive resin member of a socket portion and a metallic body are respectively molded separately, and the metallic body is secured to the thermo conductive resin member. As a result, a process of manufacturing the thermo conductive resin member and a process of securing the metallic body to the thermo conductive resin member can be carried out in parallel to each other and thus a manufacturing tact of the socket portion can be reduced, and moreover, the manufacturing costs are saved, and the durability of a die can be improved.

MODE FOR CARRYING OUT THE INVENTION

Hereinafter, four examples of embodiments (exemplary embodiments) of a vehicular lighting instrument semiconductor light source light source unit according to the present invention and embodiments (examples) of the vehicle lighting instrument according to the present invention will be described in detail with reference to the drawings. It is to be noted that the present invention is limited by these embodiments. It is also to be noted that in FIGS. 3 to 8, FIGS. 11 to 13, FIG. 15, FIG. 17, FIG. 18, FIG. 20, FIG. 22, and FIG. 23, a control element and a wiring element are not shown.

Construction of First Embodiment

Figure 1:
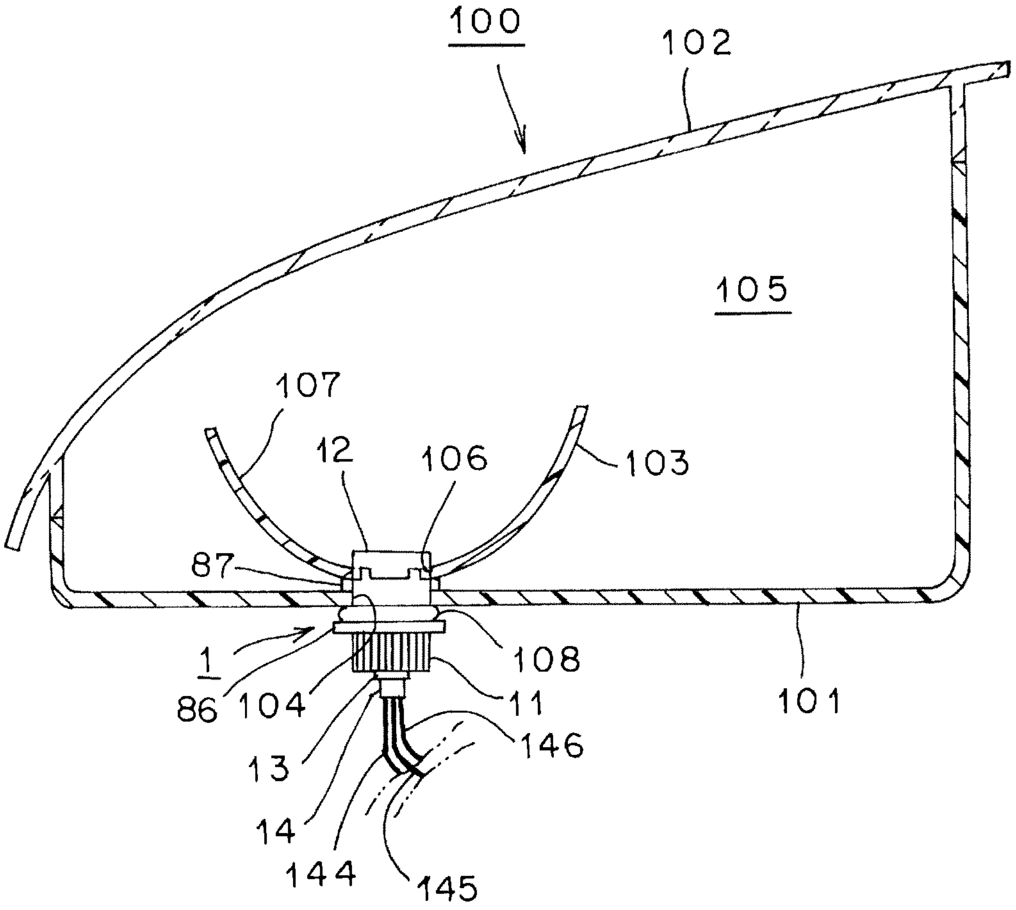
FIG. 1 shows a first embodiment of a vehicular lighting instrument semiconductor light source light source unit according to the present invention and a first embodiment of the vehicular lighting instrument according to the present invention, and is also a transverse sectional view (a horizontal sectional view) of a state in which the light source unit is assembled to the vehicular lighting instrument.

FIGS. 1 to 11 show a first embodiment of a vehicular lighting instrument semiconductor light source light source unit according to the present invention and a first embodiment of the vehicular lighting instrument according to the present invention. Hereinafter, a construction of a respective one of the vehicular lighting instrument semiconductor light source light source unit in the first embodiment and the vehicular lighting instrument in the first embodiment will be described. In FIG. 1, reference numeral 100 designates the vehicular lighting instrument in the first embodiment.

(Vehicular Lighting Instrument 100)

The vehicular lighting instrument 100 is, in this example, a single light type tail and stop lamp. That is, the vehicular lighting instrument 100 is compatible with a tail lamp function and a stop lamp function by way of single light (one lamp or one lighting instrument). The vehicular lighting instrument 100 is equipped on a respective one of the left and right of a rear part of a vehicle (not shown). The vehicular lighting instrument 100 may constitute a rear combination lamp in combination with another lamp functions, although not shown (for example, a backup lamp function or a turning signal lamp function). It is to be noted that the vehicular lighting instrument 100 is a tail and stop lamp and thus a front face in the vehicular lighting instrument 100 is a face which is seen from a rear side of the vehicle.

The vehicular lighting instrument 100, as shown in FIG. 1, is provided with: a lamp housing 101 and a lamp lens 102 and a reflector 103; and a light source unit which employs a semiconductor light source as a light source, that is, a light source unit 1 of the semiconductor light source of the vehicular lighting instrument in the first embodiment; and a driving circuit (not shown) of the semiconductor light source of the light source unit 1.

The lamp housing 101 is composed of an optically impermeable member, for example, (a resin member, for example). The lamp housing 101 forms a hollowed shape, one side of which opens and the other side of which is closed. In the thus closed portion of the lamp housing 101, a through hole 104 is provided. The through hole 104 forms a circular shape. At an edge of the through hole 104, a plurality of recessed portions (not shown) and a plurality of stopper portions (not shown) are provided at substantially equal intervals.

The lamp lens 102 is composed of an optically permeable member (for example, a transparent resin member or a glass member). The lamp lens 102 forms a hollowed shape, one side of which opens and the other side of which is closed. A circumferential edge part of an opening portion of the lamp lens 102 and a circumferential edge part of an opening portion of the lamp housing 101 are secured to each other with appropriate water tightness. By the lamp housing 101 and the lamp lens 102, a lamp room 105 is partitioned.

Figure 3:
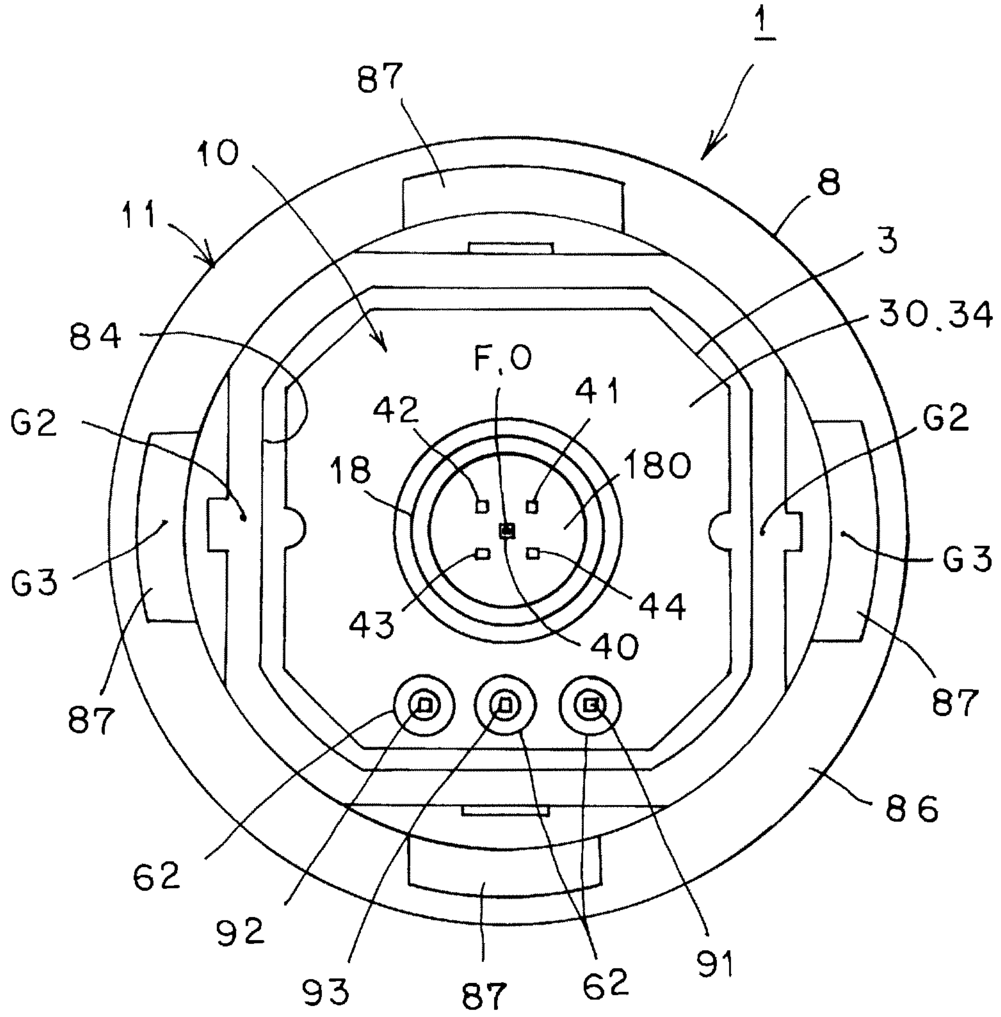
FIG. 3 is a plan view showing a state in which the light source portion and the socket portion of the light source unit are assembled to each other.

The reflector 103 is a light distribution control portion to optically distribute and control the light that is radiated from the light source unit 1 so as to be focused at a focal point F (refer to FIG. 3). The reflector 103 is disposed in the lamp room 105, and is secured to the lamp housing 101 or the like. The reflector 103 is composed of an optically impermeable member (for example, a resin member or a metallic body), for example. The reflector 103 forms a hollowed shape, one side of which opens and the other side of which is closed. In the thus closed portion of the reflector 103, a through hole 106 is provided so as to communicate with the through hole 104 of the lamp housing 101. On an interior face of the reflector 103, a reflection surface 107 is provided. It is to be noted that, although the reflector 103 is made of a member independent of the lamp housing 101, this reflector may be integrated with the lamp housing. In this case, a reflection surface is provided at a part of the lamp housing, and a reflector function is provided.

(Light Source Unit 1)

The light source unit 1, as shown in FIGS. 1 and 3, is provided with: a light source portion (an optical part) 10; a socket portion (a socket part) 11; and a cover portion (a cover part) 12 as an optical part. The light source portion 10 and the cover portion 12 are mounted to one end part of the socket portion 11 (a frontal end part). The light source portion 10 is covered with the cover portion 12.

Figure 11:
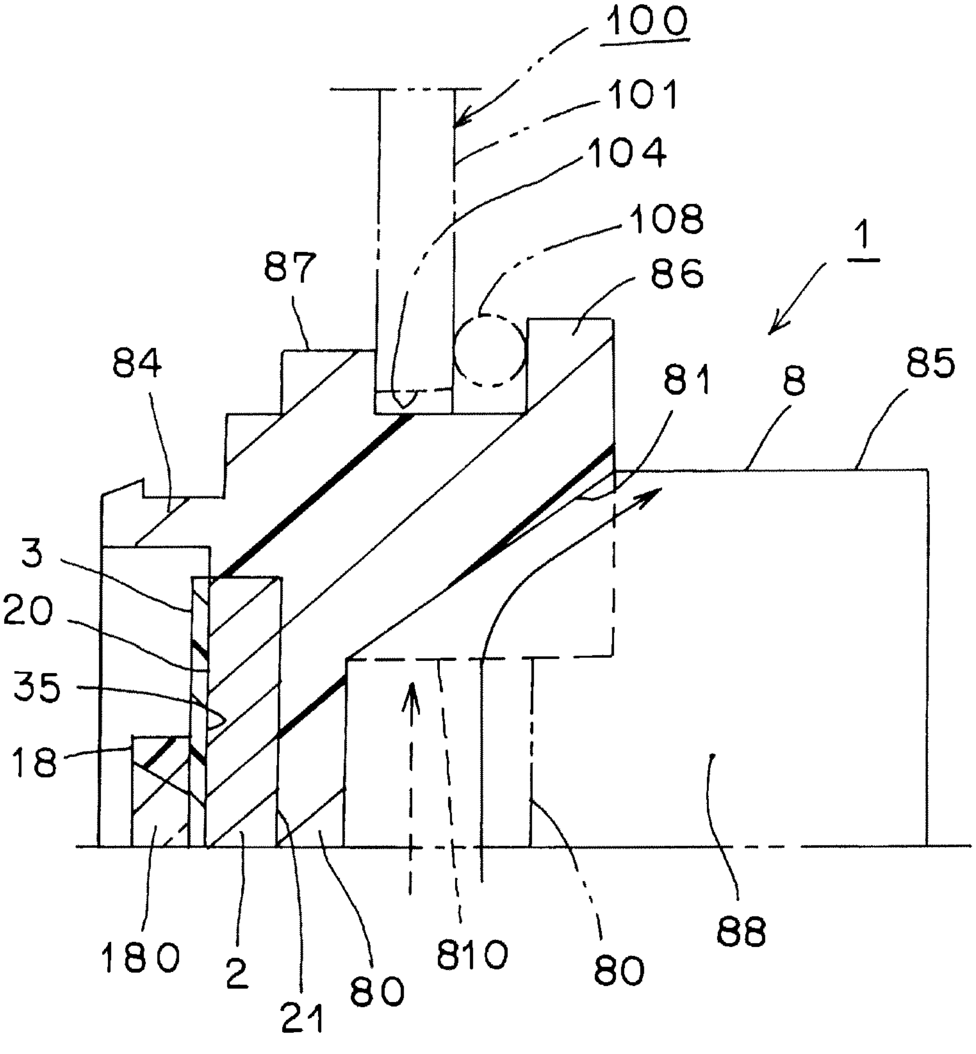
FIG. 11 is a sectional view taken along the line XI-XI in FIG. 2.

The light source unit 1, as shown in FIGS. 1 and 11, is provided in the vehicular lighting instrument 100. That is, the socket portion 11 is removably mounted to the lamp housing 101 via packing (an O-ring) 108. The light source portion 10 and the cover portion 12 are disposed in the lamp room 105 and on the reflection surface 107 side of the reflector 103 in the lamp room 105 through the through hole 104 and the through hole 106 of the reflector 103.

(Light Source Portion 10)

Figure 4:
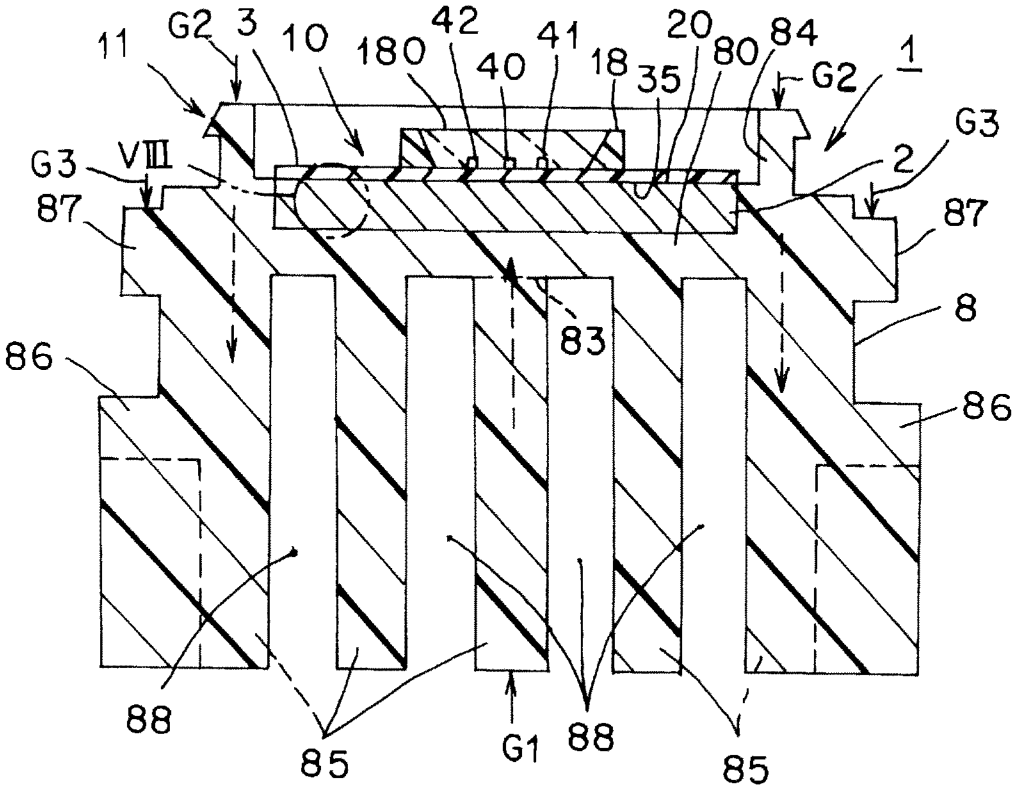
FIG. 4 is a sectional view taken along the line IV-IV in FIG. 2.
Figure 7:
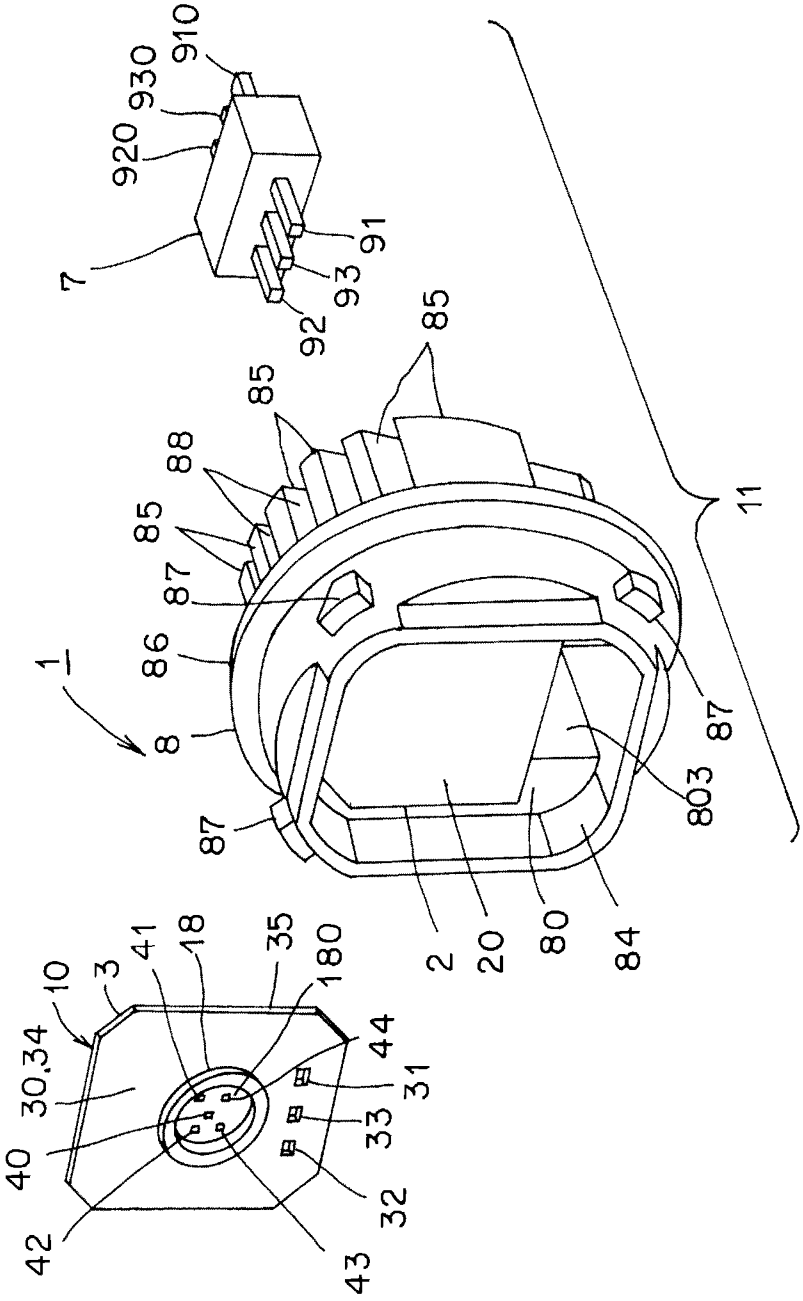
FIG. 7 is an exploded perspective view showing the board of the light source portion, the thermo conductive resin member of the socket portion, and the insulation member and the electric power feeding member of the socket portion.

The light source portion 10, as shown in FIGS. 3, 4, and 7, is provided with: a board 3; a plurality of, in this example, five light emitting chips 40, 41, 42, 43, 44 of the semiconductor light source (hereinafter, there may be referred to as "40 to 44"); a control element (not shown); a wiring element (not shown); an surrounding wall member 18; and a sealing member 180.

(Board 3)

The board 3 is made of ceramics, in this example. The board 3, as shown in FIGS. 3 to 8 and FIG. 11, forms a shape of a substantially rectangular plate or a shape of an octal plate clipping four corners when it is seen in a planar view. In one edge (a bottom edge) of the board 3, through holes 31, 32, 33 through which power feeding members 91, 92, 93 of the socket portion 11 (hereinafter, there may be referred to as "91 to 93") are to be inserted are respectively provided by way of punching. On one face (a top face) of the board 3, a flat mounting face 34 is provided. On the other face (a bottom face) of the board 3, a flat abutment face 35 is provided. It is to be noted that, on a mounting face 34 of the board 3 made of ceramics of a high reflection member, a high reflection surface 30 such as high reflection coating or high reflection vapor deposition may be provided.

On the mounting face 34 of the board 3, the five light emitting chips 40 to 44 and the control element and the wiring element and the surrounding wall member 18 are mounted (that is, are provided by way of printing, burning, vapor deposition, adhesive bonding, engagement or the like).

(Light Emitting Chips 40 to 44)

The semiconductor light source made of the five light emitting chips 40 to 44 uses a self-emitting semiconductor light source such as an LED, an EL (an organic EL) (an LED in the first embodiment). The light emitting chips 40 to 44, as shown in FIGS. 3 and 7, are made of very small rectangular (square- or rectangle-shaped) semiconductor chips (light source chips) when these elements are seen from a front side (in the perpendicular direction with respect to the mounting face 34 of the board 3, and are made of bare chips, in this example. The five light emitting chips 40 to 44 radiate light from one front face other than the mounting face on the board 3 and four side faces.

In so far as the five light emitting chips 40 to 44 are concerned, as shown in FIG. 3, one chip (40) is disposed at the focal point F of the reflector 103 of an optical system and in the vicinity of a center (a mounting rotation center) O of the socket portion 11 of the light source unit 1, and four chips (41 to 44) are disposed at substantially equal intervals on a circumference about the focal point F and the center O.

The five light emitting chips 40 to 44 are light emitting chips to which a fine current is to be supplied, and which are divided into: one light emitting chip 40 which is a light source of a tail lamp, that is, the light emitting chip 40 of a first group; and a set of four light emitting chips 41 to 44 which are light emitting chips to which a mass current (a mass current in comparison with the current supplied to the light emitting chip 40) is to be supplied, and which are light sources of a stop lamp, that is, the light emitting chips 41 to 44 of a second group.

One light emitting chip 40 of the tail lamp function (the light source of the tail lamp) is disposed at the focal point F and the center O and also at a center of the four light emitting chips 41 to 44 of the stop lamp function (the light sources of the stop lamp) which are disposed on the circumference. That is, one light emitting chip 40 of the tail lamp function is disposed at the center of the five light emitting chips 40 to 44. The four light emitting chips 41 to 44 of the stop lamp function are connected in series in a forward direction (in the direction of the flow of current).

Among the five light emitting chips 40 to 44, one light emitting chip 40 of the tail lamp function is disposed at a center O of the board 3 and also at or near a center O of the thermo conductive resin member 8 which will be described later. That is, a center of one light emitting chip 40 of the tail lamp function and the center of the board 3 (the center O of the thermo conductive resin member 8 which will be described later) are coincident with or substantially coincident with each other.

(Surrounding Wall Member 18)

The surrounding wall member 18 is composed of an insulation member, for example, a resin, or alternatively, a resin having an improved reflection index, in this example. The surrounding wall member 18, as shown in FIGS. 3, 4, and 7, forms a shape of a circular ring surrounding all of the five light emitting chips 40 to 44 and a part of the wiring element. That is, the surrounding wall member 18 forms the shape of the circular ring, a center part of which is a hollowed portion and a circumferential part of which is a wall portion. A thickness of the wall portion of the surrounding wall member 18 (a thickness from an inner circumferential face to an outer circumferential face of the wall portion) is substantially uniform (equal).

The surrounding wall member 18 has a more sufficient height than that of a respective one of the light emitting chips 40 to 44 and the wiring element. The surrounding wall member 18 is a member (a bank, a dam) to restrain a capacity (a range) of filling (charging, mold, or molding) of the sealing member 180 up to a small capacity. One end face of the wall portion of the surrounding wall member 18 is secured and positioned on the mounting face 34 of the board 3 by way of engagement and adhesive bonding.

On an inner circumferential face of the wall portion of the surrounding wall member 18, there is provided a reflection surface to reflect the light (not shown) that is radiated from the light emitting chips 40 to 44 (in particular, four side faces of the light emitting chips 40 to 44) in a predetermined direction (for example, in a direction which is substantially identical to a direction of the light that is radiated from one front face of the respective one of the light emitting chips 40 to 44). The reflection surface is inclined to broaden outwardly from one end (a lower end) to the other end (an upper end) of the inner circumferential face of the wall portion. The reflection surface is formed by the entirety of the surrounding wall member 18 being composed of a member with a high reflection index, for example, by a PBT resin containing titanium oxide or the like to whiten the entirety of the surrounding wall portion 18, or alternatively, by only the inner circumferential face of the wall portion of the surrounding wall member 18 being composed of a member with a high reflection index.

(Sealing Member 180)

The sealing member 180 is composed of an optically impermeable member, for example, an epoxy resin or a silicone resin.

The sealing member 180 is filled in the hollowed portion of the surrounding member 18 that is mounted on the board 3 after the light emitting chips 40 to 44 have been mounted on the board 3 and relevant wires are bonded and arranged and in a space which is partitioned by the mounting face 34 of the board 3 and the inner circumferential face of the wall portion of the surrounding wall member 18. The sealing member 180 cures, whereby all of the five light emitting chips 40 to 44 and a part of the wiring element are sealed by the sealing member 180.

The sealing member 180 precludes all of the five light emitting chips 40 to 44 and a part of the wiring element from being affected by an external factor, for example, contact of another object or adherence of dust, and protects these chips from ultraviolet ray of light or NOx or water. That is, the sealing member 180 protects the five light emitting chips 40 to 44 or the like from an external disturbance.

(Socket Portion 11)

The socket portion 11, as shown in FIGS. 2 to 7 and FIG. 11, is provided with: an insulation member 7; a thermo conductive resin member 8; the three power feeding members 91 to 93; and a metallic body 2. The thermo conductive resin member 8 having its thermal conductivity and its electrical conductivity and the electric power feeding members 91 to 93 having its electrical conductivity are integrally incorporated in a state in which these members are insulated from each other via the insulation member 7 having its insulation property.

The socket portion 11 is made of an integrated structural part of the insulation member 7, the thermo conductive resin member 8, and the electric power feeding members 91 to 93. For example, this socket portion is a structural part formed in such a manner that the insulation member 7, the thermo conductive resin member 8, and the electric power feeding members 91 to 93 are integrally formed by insert molding (integral molding). Alternatively, the socket portion mentioned above is a structural part formed in such a manner that the insulation member 7 and the electric power feeding members 91 to 93 are integrally formed by insert molding (integral molding), and the insulation member 7 and the electric power feeding members 91 to 93 that are integrally formed are integrally mounted to the thermo conductive resin member 8. Alternatively, the socket portion mentioned above is a structural part formed in such a manner that the electric power feeding members 91 to 93 are integrally assembled to the insulation member 7, and the insulation member 7 and the electric power feeding members 91 to 93 that are integrally assembled to each other are also integrally mounted to the thermo conductive resin member 8. That is, the socket portion mentioned above is an integrated structure part formed in such a manner that the insulation member 7 and the thermo conductive resin member 8 are respectively molded separately and engaged with each other. Alternatively, the socket portion mentioned above is an integrated structural part formed in such a manner that the insulation member 7 and the thermo conductive resin member 8 are integrally molded with each other by way of two-color molding.

(Insulation Member 7)

The insulation member 7, as shown in FIG. 2 and FIGS. 4 to 7, sheaths an intermediate part as a part of the electric power feeding members 91 to 93, and incorporates the thermo conductive resin member 8 and the electric power feeding members 91 to 93 in a state in which these members are insulated from each other. The insulation member 7 is made of an insulation resin member, for example, and one end parts of the electric power feeding members 91 to 93 protrude from one end face of the insulation member 7. The other end parts of the electric power feeding members 91 to 93 protrude from the other end face of the insulation member 7.

(Thermo Conductive Resin Member 8)

In so far as the thermo conductive resin member 8 is concerned, as shown in FIGS. 3 to 5, FIG. 8, and FIG. 11, the light source portion 10 is mounted via the metallic body 2, and a heat which is generated at the light source portion 10 is radiated to the outside via the metallic body 2. The thermo conductive resin member 8 is composed of a thermo conductive resin, for example, a resin containing carbon fiber (short carbon fiber), or alternatively, carbon granule, or alternatively, a mixture of carbon fiber and carbon granule. The thermo conductive resin member 8, in this example, is composed of an insert molded article of a resin containing at least carbon fiber.

The thermo conductive resin member 8 forms a cylindrical shape, an outer diameter of which is slightly smaller than an inner diameter of the through hole 104 of the lamp housing 101. In a top plate portion 80 of one end part of the thermo conductive resin member 8 (a front end part and an end part at the side at which the light source portion 10 is mounted), the metallic body 2 is integrally embedded by way of insert molding (integral molding). One face of the top plate portion 80 and an abutment face 20 as one face of the metallic body 2 are substantially in flush with each other. It is to be noted that the abutment face 20 of the metallic body 2 may be positioned to be upper than one face of the top plate portion 80. In this case, the abutment face 20 of the metallic body 2 and the abutment face 35 of the board 3 are easily brought into contact with each other.

Figure 8:
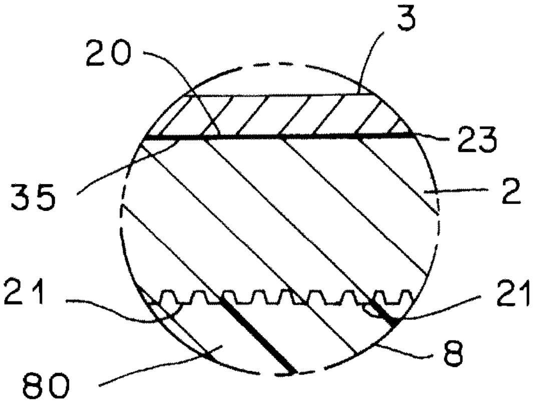
FIG. 8 is an enlarged sectional view of the portion VIII in FIG. 4.

The abutment face 20 of the metallic body 2 and the abutment face 35 of the board 3 are adhesively bonded with each other by a thermo conductive member 23, in a state in which these two faces are abutted against each other (refer to the thick line in FIG. 8). As a result, the light emitting chips 40 to 44 are positioned at or near the center O of the thermo conductive resin member 8 (the center O of the socket portion 11) via the board 3. It is to be noted that the thermo conductive medium 23 is a thermo conductive adhesive bond or thermo conductive grease, for example.

On an outer circumference of the top plate portion 80, a circular ring-shaped board protection wall 84 is integrally provided so as to surround the metallic body 2 and the board 3. As a result, the board 3 is housed in the board protection wall 84, and is protected by the board protection wall 84. It is to be noted that, from the circular ring-shaped board protection wall 84, there may be cut out sites on which four corners of the square board 3 are positioned.

At the other end part of the thermo conductive resin member 8 (a rear end part and an opposite end part to an end part at the side at which the light source portion 10 is mounted), a plurality of heat radiation fin portions 85 are integrally provided. That is, the fin portions 85 are integrally protrusively provided from the other face of the top plate portion 80. A longitudinal direction of the fin portions 85, as shown in FIG. 11, is positioned in the perpendicular direction (the vertical direction) when the vehicular lighting instrument 100 provided with the light source unit 1 is provided in a vehicle (not shown).

Between a plurality of the fins 85, a plurality of through gaps 88 for generation of convection current are provided. The through gaps 88 are positioned in the perpendicular direction (the vertical direction) when the vehicular lighting instrument 100 provided with the light source unit 1 is provided in the vehicle. An upper end part 89 of the through gap 88 is opened.

At a lower side of a respective one of the fin portions 85 at the other end part of the thermo conductive resin member 8, that is, at a lower center part when the vehicular lighting instrument 100 provided with the light source unit 1 is provided in the vehicle, a connector engagement portion 800 is integrally provided. The connector engagement portion 800 forms a hollowed rectangular shape. As a result, the through gap 88 on each of the left and right sides of the connector engagement portion 800 penetrates from bottom to top. On the other hand, the through gap 88 at an upper side of the connector engagement portion 800 penetrates upward from the connector engagement portion 800.

Figure 5:
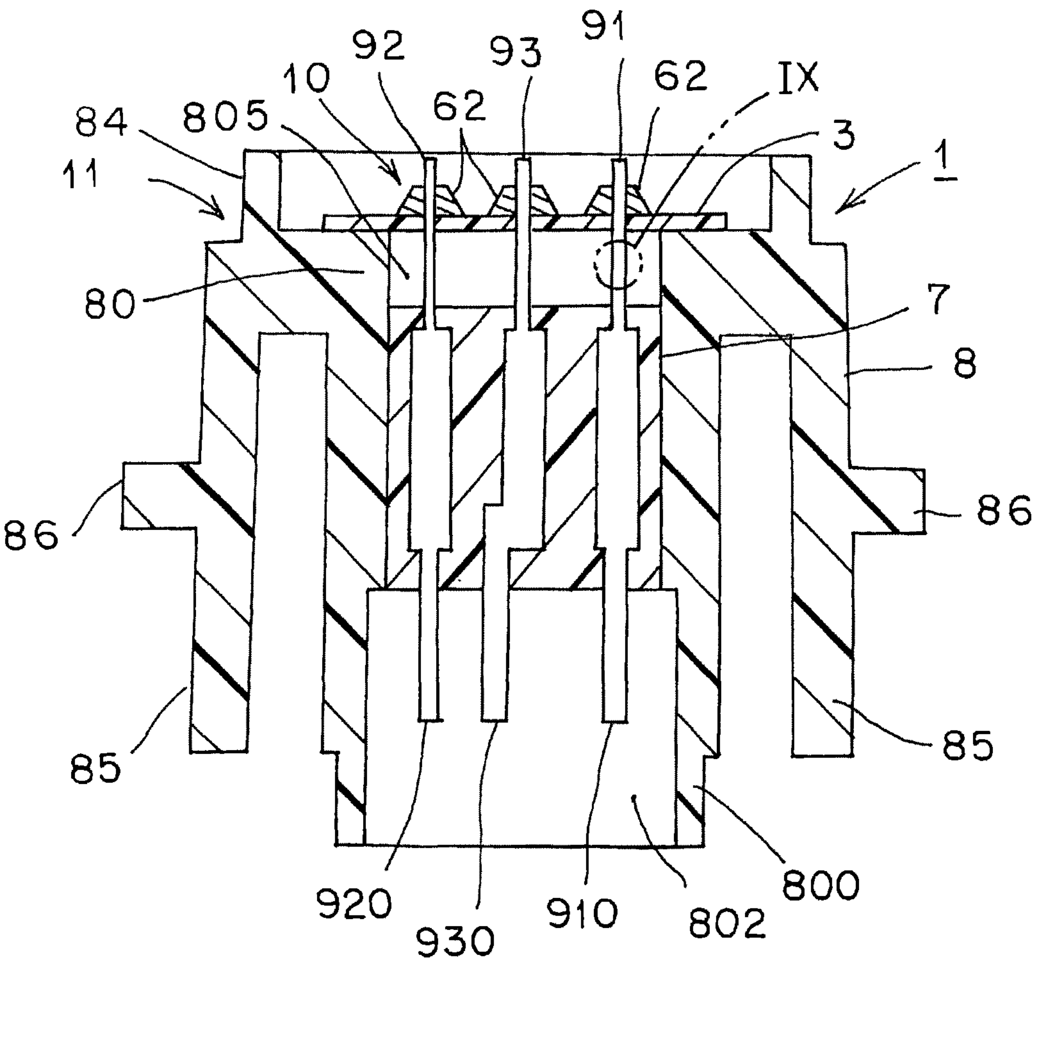
FIG. 5 is a sectional view taken along the line V-V in FIG. 2.
Figure 6:
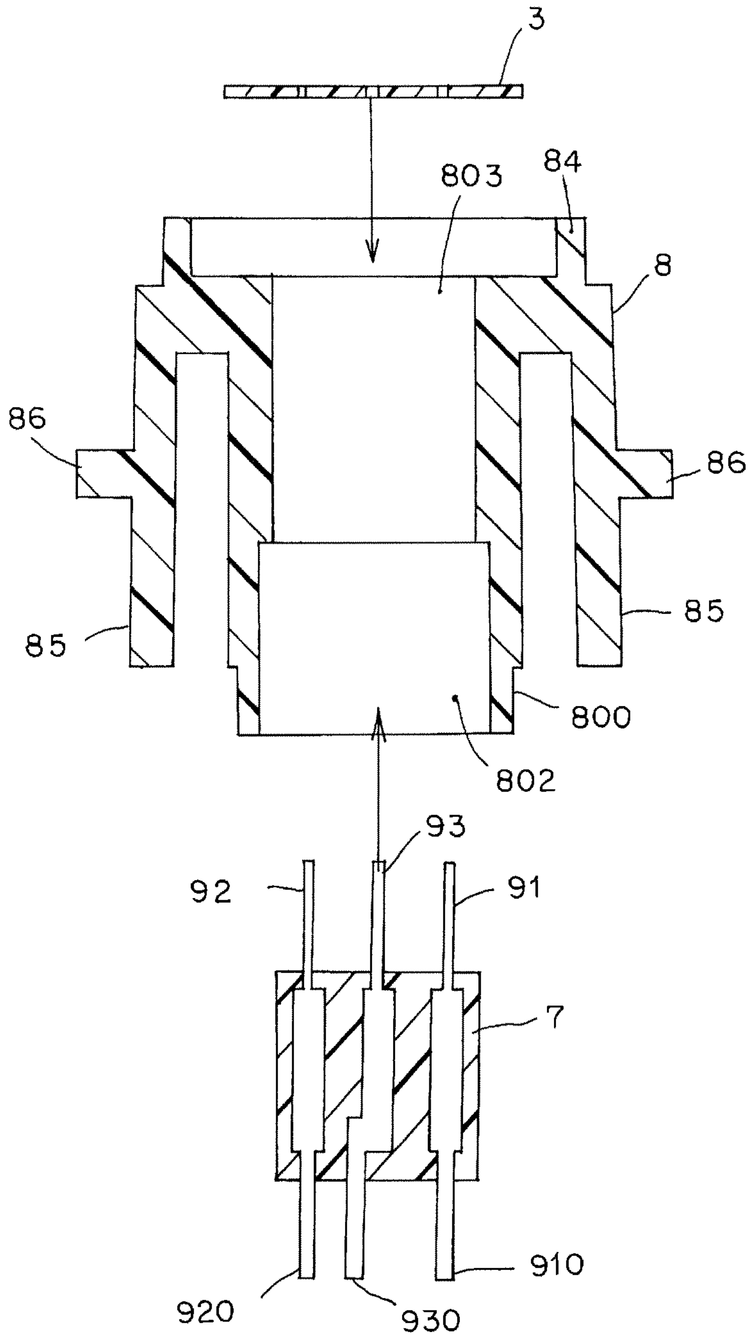
FIG. 6 is an exploded sectional view (an exploded sectional view corresponding to FIG. 5) showing a board of the light source portion, a thermo conductive resin member of the socket portion, an insulation member and an electric power feeding member of the socket portion.

As shown in FIGS. 5 and 6, of the inside of the thermo conductive resin member 8, at a portion between the top plate portion 80 and a recessed portion 802 of the connector engagement portion 800, a mounting through hole 803 is provided. Into the mounting through hole 803, the insulation member 7 in which the electric power feeding members 91 to 93 are integrally incorporated is inserted, and the inserted member is secured to the top plate portion 80 through the recessed portion 802 of the connector engagement portion 800. As a result, the thermo conductive resin member 8 and the electric power feeding members 91 to 93 are integrally assembled in a state in which these members are insulated from each other via the insulation member 7. That is, the insulation member 7 is interposed between the thermo conductive resin member 8 and a respective one of the electric power feeding members 91 to 93. The thermo conductive resin member 8 comes into intimate contact with the insulation member 7. The electric power feeding members 91 to 93 come into intimate contact with the insulation member 7.

On an outer circumferential face of an intermediate part of the thermo conductive resin member 8, there is integrally provided a disk-shaped jaw portion 86 to bring the packing 108 into pressure contact with the lamp housing 101 (refer to FIGS. 1 and 11). On the outer circumferential face of the intermediate part of the thermo conductive resin member 8, a plurality of, in this example, four mounting portions 87 are caused to correspond to the recessed portion of the lamp housing 101, and are integrally provided to be opposite to the jaw portion 86.

The jaw portion 86 and the four mounting portions 87 constitute mounting portions for providing the light source unit 1 in the vehicular lighting instrument 100. That is, a part of the cover portion 12 side of the socket portion 11 and the mounting portions 87 are inserted into the through holes 104 and the recessed portions of the lamp housing 101. In this state, the socket portion 11 is rotated about a central axis O, and the mounting portions 87 abut against the stopper portion of the lamp housing 101. At this point of time, the mounting portions 87 and the jaw portion 86 pinch an edge part of the through hole 104 of the lamp housing 101 via the packing 108 from upper and lower sides (refer to FIGS. 1 and 11).

As a result, the socket portion 11 of the light source unit 1, as shown in FIGS. 1 and 11, is removably or securely mounted to the lamp housing 101 of the vehicle lighting instrument 100 via the packing 108. At this point of time, as shown in FIGS. 1 and 11, a portion protruding to the outside from the lamp housing 101 of the socket portion 11 (a portion which is lower than the lamp housing 101 in FIG. 1) is larger than a portion which is housed in the lamp room 105 of the socket portion 11 (a portion which is upper than the lamp housing 101 in FIG. 1).

Figure 10:
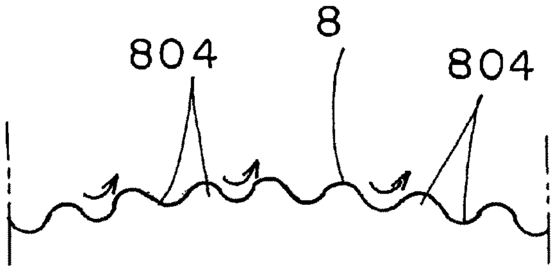
FIG. 10 is an enlarged view of the portion X in FIG. 2.

The thermo conductive resin member 8 forms an exterior portion (an outside portion) of the socket portion 11. As shown in FIG. 10, on an exterior face of the thermo conductive resin member 8 (exterior faces of the substrate protection wall 84, the fin portions 85, the jaw portion 86, the mounting portions 87, and the connector engagement portion 800), fine irregularities 804 are provided.

As shown in FIG. 11, an upper part of a base portion between the top plate portion 80 and a respective one of the fin portions 85 of the thermo conductive resin member 8 (an upper part when the vehicular lighting instrument 100 provided with the light source unit 1 is provided in a vehicle (not shown)) is defined as an inclined face 81 as indicated by the solid line from a horizontal face as indicated by the dashed line. In this manner, a convention current as indicated by the solid line-contoured arrow in FIG. 11 is generated. In this manner, a heat radiation effect is improved.

If the thickness of the top plate portion 80 is substantially equal to a small thickness as indicated by the solid line in FIG. 11, that is, the thickness of the respective one of the fin portions 85 from a large thickness as indicated by the double-dotted chain line in FIG. 11, a longitudinal direction of carbon fiber in the thermo conductive resin member 8 and a heat transmission direction (a heat radiation route) are substantially coincident with each other and thus heat radiation efficiency is improved. However, if the thickness of the top plate portion 80 is merely reduced, the depth of the horizontal face 810 at the upper part of the base portion between the top plate portion 80 and the respective one of the fin portions 85 increases (refer to the dashed line in FIG.

11). As a result, as indicated by the dashed line-contoured arrow in FIG. 11, the convention current is prone to stagnate on the horizontal face 810 indicated by the dashed line in FIG. 11. Thus, as described previously, the horizontal face 810 is defined as the inclined face 81.

(Gates G1, G2, G3 of Thermo Conductive Resin Member 8)

The thermo conductive resin member 8, in this example, is composed of an insert molded article of a resin containing carbon fiber. In respect of gates of a molding die (not shown) at the time of insert molding of the thermo conductive resin member 8, in this example, as shown in FIG. 4, a one-point gate G1 is provided, or alternatively, as shown in FIGS. 3 and 4, two-point gates G2, G3 are provided.

Figure 2:
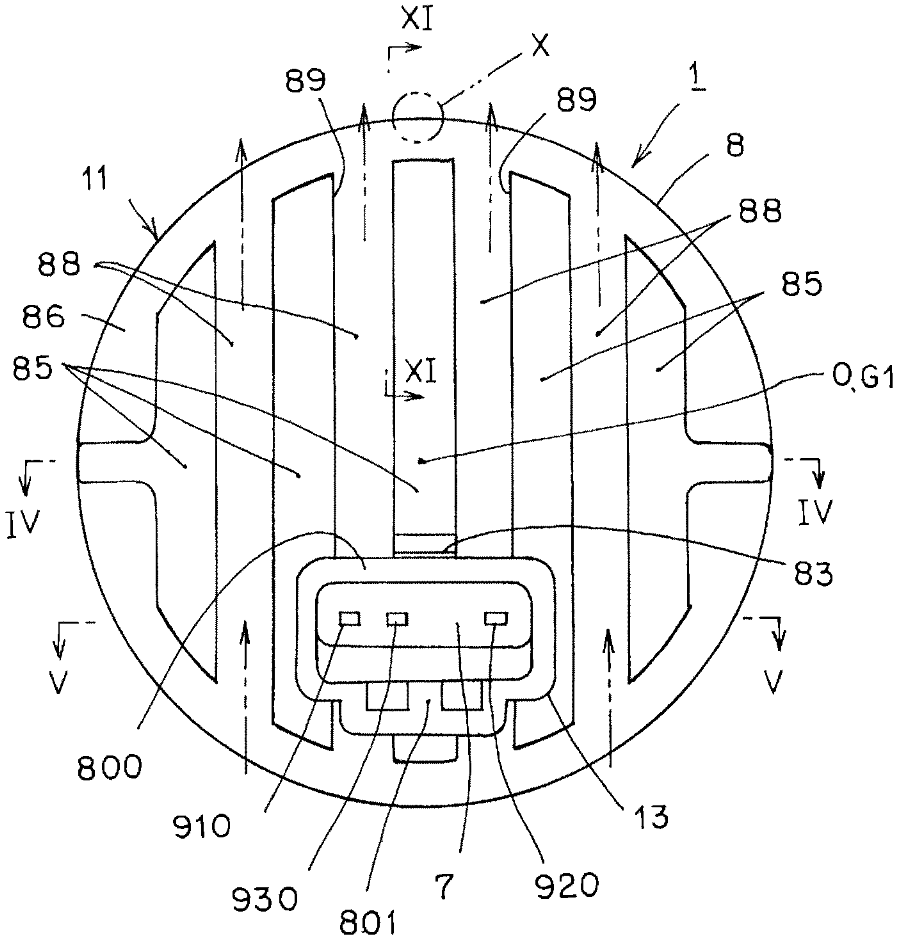
FIG. 2 is a rear view showing a state in which a light source portion and a socket portion of the light source unit are assembled to each other.

The one-point gate G1 is positioned at or near a center of the other end face of the thermo conductive resin member 8 (a center (mounting center) O of the socket portion 11), that is, at or near the center of the other end face of the central fin portion 85 of the five fin portions 85. In the one-point gate G1, as shown in FIGS. 2 and 4, from the center fin 85 at which the one-point gate G1 is positioned, a portion 83 communicating with the connector engagement portion 800 as a part of the thermo conductive resin member 8 constituting a connector portion 13 is clipped. The portion 83 is clipped up to the other end face of the top plate portion 80 (a valley face of the respective one of the fin portions 85) or up to the vicinity thereof.

The two-point gates G2, G3 are positioned on one straight line or one substantially straight line passing through the center O of the socket portion 11 on one end face of the thermo conductive resin member 8. That is, the two-point gate G2 are positioned on one straight line or one substantially straight line on one end face of the board protection wall 84, and the two-point gate G3 is positioned one straight line or a one substantially straight line on one end face of the mounting portion 87, respectively. The two-point gates G2, G3 are positioned to be upper than a face 21 coming into contact with the thermo conductive resin member 8 of the metallic body 2 (an opposite face to the abutment face 20) at the time of molding of the thermo conductive resin member 8.

By the gates G1, G2, G3, the flow direction of the resin containing carbon fiber for molding the thermo conductive resin member 8 (the direction as indicated by the dashed line-contoured arrow in FIG. 4) is substantially coincident with the protrusion direction of the fine portion 85 in the fin portions 85 (the direction as indicated by the dashed line-contoured arrow in FIG. 4) and is substantially coincident with a facial direction of the top plate portion 80 in the top plate portion 80 (the direction that is substantially perpendicular to the direction as indicated by the dashed line-contoured arrow in FIG. 4). As a result, a heat radiation route of the thermo conductive resin member 8 and a longitudinal direction of carbon fiber of the thermo conductive resin member 8 are substantially coincident with each other, and heat radiation efficiency can be improved. It is to be noted that installation sites and the number of settings of the games are not limitative in particular.

(Metallic Body 2)

The metallic body 2, in this example, forms a shape of a plate made of aluminum, and is molded by way of press processing. On the contact face 21 of the metallic body 2, fine irregularities (refer to FIG. 8) is provided by way of roughness processing which is carried out at the same time of press processing. As a result, on the fine irregularities of the contact face 21 of the metallic body 2, carbon fiber of a resin molding the thermo conductive resin member 8 twines, and a so called anchoring action, intimacy between the contact face 21 of the metallic body 2 and the top plate portion 80 of the thermo conductive resin member 8 is improved, and heat radiation efficiency is improved. In particular, by setting the positions of the gates G1, G2 at the positions shown in FIG. 4, the flow direction of the resin containing the carbon fiber for molding the thermo conductive resin member 8 (the direction as indicated by the dashed line-contoured arrow in FIG. 4) is substantially coincident with the facial direction of the top plate portion 80 in the top plate portion 80 (the direction that is substantially orthogonal to the direction as indicated by the dashed line-contoured arrow in FIG. 4) and thus the carbon fiber further easily twines on the fine irregularities of the contact face 21, and further, the anchoring action works, and the intimacy and the heat radiation efficiency are further improved.

(Power Feeding Members 91 to 93)

The electric power feeding members 91 to 93 are electrically connected to the light source portion 10, and feeds electric power to the light source portion 10. One end parts of the electric power feeding members 91 to 93 (end parts to be mounted to the board 3) are respectively made of straight pins. One end parts of the electric power feeding members 91 to 93 of the straight lines are displayed on a transverse straight line, and protrude from one end face of the insulation member 7 (a face opposite to the board 3). One end parts of the electric power feeding members 91 to 93 penetrate the board 3, and are electrically connected and mechanically mounted by a soldering iron 62. It is to be noted that laser welding deposition or the like may be carried out in place of the soldering 62.

Between one end face of the insulation member 7 in which the electric power feeding members 91 to 93 are integrally incorporated and an abutment face 35 of the board 3, a space 805 is provided as a part of the mounting through hole 803 of the thermo conductive resin member 8. The space 805 mitigates a stress in the XY direction (one end face of the insulation member 7, a facial direction on the abutment face 35 of the board 3) acting on a site corresponding to one end face of the insulation member 7 among the electric power feeding members 91 to 93, or alternatively, on a site corresponding to the abutment face 35 of the board 3 among the electric power feeding members 91 to 93.

Figure 9:
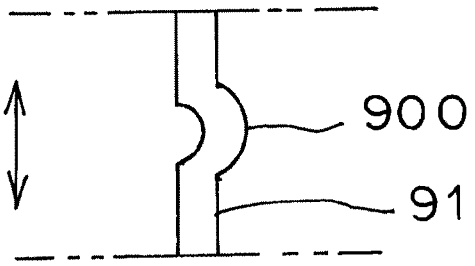
FIG. 9 is an enlarged view of the portion IX in FIG. 5.

As shown in FIG. 9, among the electric power feeding members 91 to 93, at a portion between one end face of the insulation member 7 and the abutment face 35 of the board 3, there is provided a stress mitigating portion 900 formed in a lateral U-shape. The stress mitigating portion 900 mitigates a stress in the Z direction acting on a portion between one end face of the insulation member 7 and the abutment face 35 of the board 3 among the electric power feeding members 91 to 93 (the vertical facial direction with respect to one end face of the insulation member 7 and the abutment face 35 of the board 3 and the direction as indicated by the solid line-contoured arrow in FIG. 9). The stress mentioned above is a stress which is generated between parts and members with different thermal expansion rates in change of the ambient temperature environment of the vehicle.

The other end parts of the electric power feeding members 91 to 93 (the opposite end parts to the end part mounted to the board 3) are disposed on one straight line, and protrude from the other end face of the insulation member 7 (an opposite face to a face opposed to the board 3). The other end parts of the electric power feeding members 91 to 93 constitute terminals 910, 920, 930 (hereinafter, there will be occasionally referred to as "910 to 930") which are disposed one straight line in the recessed portion 802 in the connector engagement portion 800 of the thermo conductive resin member 8.

(Connector Portion 13 and Connector 14)

The connector engagement portion 800 as a part of the thermo conductive resin member 8 and the terminals 910 to 930 as a part of the electric power feeding members 91 to 93 constitute a connector portion 13. To the connector portion 13, a power supply side connector 14 is mounted mechanically removably and electrically intermittently.

As shown in FIG. 1, the connector 14 is connected to a power source (direct current power supply batteries), although mot shown, via harnesses 144, 145 and switches (not shown). The connector 14 is earthed (grounded) via a harness 146. The connector 13 and the connector 14 are connection portions and connectors of type of three pins (the three electric power feeding members 91 to 93, the three terminals 910 to 930, three power supply side terminals).

The connector 13 is provided at a lower side of the other end part of the socket portion 11 (an opposite end part to an end part at the side at which the light source portion 10 is mounted). That is, the connector portion 13 is positioned at a lower side when the vehicular lighting instrument 100 provided with the light source unit 1 is provided in the vehicle).

The connector engagement portion 800 surrounds the terminals 910 to 930 that are disposed on a lateral straight line. The connector engagement portion 800 forms a hollowed elongated rectangular shape (refer to FIG. 2). At a lower edge of the connector engagement portion 800, a locking portion 801 is provided. Inside of the connector engagement portion 800, the recessed portion 802 is formed.

On the other hand, an external shape of the connector 14 forms a rectangular shape in conjunction with an internal shape of the connector engagement portion 800 of the connector portion 13. At a lower edge of the connector 14, a locking portion (not shown) is provided.

(Cover Portion 12)

The cover portion 12 is made of an optically permeable member. At the cover portion 12, there is provided an optical control portion such as a prism (not shown) to optically control and emit the light from the five light emitting chips 40 to 44. The cover portion 12 is an optical part.

The cover portion 12, as shown in FIG. 1, is mounted to one end part (one end opening portion) of the socket portion 11 of a cylindrical shape so as to cover the light source portion 10 therewith. The cover portion 12, together with the sealing member 180, precludes the five light emitting chips 40 to 44 from being affected by an external, for example, contact of another object or adherence of dust, and protects these chips from ultraviolet ray, sulfide gas, NOx, or water. That is, the cover portion 12 protects the five light emitting chips 40 to 44 from an external disturbance. In addition, the cover portion 12 protects the control element and the wiring element and the electrical conductive adhesive bond other than the five light emitting chips 40 to 44 from an external disturbance. It is to be noted that on the cover portion 12, a ventilation hole (not shown) may be provided.

[Functions of First Embodiment]

The light source unit 1 of the semiconductor light source of the vehicular lighting instrument in the first embodiment and the vehicular lighting instrument 100 in the first embodiment (hereinafter, referred to as the light source unit 1 and the vehicular lighting instrument 100 in the first embodiment) are made of the constituent elements described above, and hereinafter, functions thereof will be described.

First, an appropriate switch is operated so that a tail lamp is lit. Then, an electric current (a driving current) is supplied to one light emitting chip 40 of a tail lamp function through a control element and a wiring element of the tail lamp function. As a result, one light emitting chip 40 of the tail lamp function emits light.

The light that is radiated from one light emitting chip 40 of the tail lamp function transmits the sealing member 180, a pneumatic air layer, and the cover portion 12 of the light source unit 1, and the light having thus transmitted is controlled to be optically distributed. It is to be noted that a part of the light that is radiated from the light emitting chip 40 is reflected at the cover portion 12 side on the high reflection surface 30 of the board 3. The optically distributed controlled light transmits the lamp lens 102 of the vehicular lighting instrument 100, is controlled to be optically distributed again, and is emitted to the outside. In this manner, the vehicular lighting instrument 100 emits light distribution of the tail lamp function to the outside.

Next, an appropriate switch is operated so that a stop lamp is lit. Then, an electric current (a driving current) is supplied to four light emitting chips 41 to 44 of the stop lamp function through a control element and a wiring element of the stop lamp function. As a result, the four light emitting chips 41 to 44 of the stop lamp function emit light.

The light that is radiated from the four light emitting chips 41 to 44 of the stop lamp function transmits the sealing member 180, the pneumatic air layer, and the cover portion 12 of the light source unit 1, and the light having thus transmitted is controlled to be optically distributed. It is to be noted that a part of the light that is radiated from the light emitting chips 41 to 44 is reflected at the cover portion 12 side on the high reflection surface 30 of the board 3. The optically distributed controlled light transmits the lamp lens 102 of the vehicular lighting instrument 100, the light having thus transmitted is controlled to be optically distributed again, and the thus controlled light is emitted to the outside. In this manner, the vehicular lighting instrument 100 emits light distribution of the stop lamp function to the outside. This light distribution of the stop lamp function is bright (large in terms of luminous flux, luminance, intensity of light, and luminous intensity) in comparison with the light distribution of the tail lamp function mentioned above.

Afterwards, an appropriate switch is operated so that the lamp goes out. Then, an electric current (a driving current) is shut out. As a result, the light from one light emitting chip 40 or the light from the four light emitting chips 41 to 44 goes out. In this manner, the light from the vehicular lighting instrument 100 goes out.

Here, the heat that is generated in the light emitting chips 40 to 44 and the control element and the wiring element of the light source portion 10 is transmitted to the thermo conductive resin member 8 via the board 3 and the thermo conductive medium 23 and the metallic body 2, and the thus transmitted heat is radiated to the outside from the thermo conductive resin member 8.

That is, the heat that is transmitted to the top plate portion 80 of the thermo conductive resin member 8 is transmitted to the fin portions 85, the board protection wall 84, the jaw portion 86, the mounting portion 87, and the connector engagement portion 800, and the thus transmitted heat is radiated (emitted) to the outside from the surfaces of the fin portions 85, the board protection wall 84, the jaw portion 86, the mounting portion 87, and the connector engagement portion 800.

Also, a part of the heat that is transmitted from the top plate portion 80 of the thermo conductive resin member 8 to the fin portions 85 is generated as a convection heat in the through gap 88 of the thermo conductive resin member 8. The convection heat is radiated to the outside through an opening of the upper end part 89 from the through gap 88 of the thermo conductive resin member 8 as indicated by the arrow contoured by the double-dotted chain line in FIG. 2.

Moreover, the convection heat that is generated in the through gap 88 of the thermo conductive resin member 8 is radiated to the outside along the inclined face 81 at an upper part of a base portion between the top plate portion 80 and the fin portions 85 as indicated by the solid line-contoured arrow in FIG. 11.

Further, a turbulence is generated in the direction as indicated by the solid line-contoured arrow in FIG. 10, by fine irregularities 804 on the exterior face of the thermo conductive resin member 8, that is, on the exterior faces of the fin portions 85, the board protection wall 84, the jaw portion 86, the mounting portion 87, and the connector engagement portion 800. Owing to the generation of the turbulence, the heat that is transmitted from the top plate portion 80 to the fin portions 85, the board protection wall 84, the jaw portion 86, the mounting portion 87, and the connector engagement portion 800 is radiated (emitted) to the outside from the exterior faces of the fin portions 85, the board protection wall 84, the jaw portion 86, the mounting portion 87, and the connector engagement portion 800. Also, by the fine irregularities 804 on the exterior face of the thermo conductive resin member 8, the radiation (emission) area is increased, and the resultant heat is efficiently radiated (emitted) to the outside accordingly.

[Advantageous Effects of First Embodiment]

The light source unit 1 and the vehicular lighting instrument 100 in the first embodiment is made of the constituent elements and functions as described above, and hereinafter, advantageous effects thereof will be described.

In so far as the light source unit 1 and the vehicular lighting instrument 100 in the first embodiment are concerned, the thermo conductive resin member 8 is used as a heat radiation member to radiate the heat that is generated at the light source portion 10 to the outside and thus it is possible to save the weight of the light source unit 1, save the manufacturing costs, and improve the durability of a die in comparison with that of the conventional aluminum die cast.

In so far as the light source unit 1 and the vehicular lighting instrument 100 in the first embodiment are concerned, the metallic body 2 is embedded in the top plate portion 80 that is a site corresponding to the light source portion 10 of the thermo conductive resin member 8. As a result, the heat that is generated at the light source portion 10 can be efficiently transmitted to the thermo conductive resin member 8 and thus a heat radiation effect which is substantially equal or more than a heat radiation effect of the conventional aluminum die cast can be achieved. In this manner, downsizing of the thermo conductive resin member 8, that is, downsizing of the light source unit 1 can be attained.

In so far as the light source unit 1 and the vehicular lighting instrument 100 in the first embodiment are concerned, on the face 21 coming into contact with at least the thermo conductive resin member 8 of the metallic body 2, fine irregularities (refer to FIG. 8) are provided by way of roughness processing that is carried out at the same time of press processing; the metallic body 2 is insert molded in the thermo conductive resin member 8; and the thermo conductive resin member 8 is composed of an insert molded article of the resin containing carbon fiber. As a result, on the fine irregularities of the contact face 21 of the metallic body 2, the carbon fiber of the resin molding the thermo conductive member 8 twines, and by a so called anchoring action, the intimacy between the contact face 21 of the metallic body 2 and the top plate portion 80 of the thermo conductive resin member 8 is improved, and the heat radiation efficiency is improved. In particular, by setting the positions of the gates G1, G2, G3 at the positions shown in FIG. 4, the flow direction of the resin containing the carbon fiber for molding the thermo conductive resin member 8 (the direction as indicated by the dashed line-contoured arrow in FIG. 4) is substantially coincident with the facial direction of the top plate 80 in the top plate portion 80 (the direction that is substantially orthogonal to the direction as indicated by the dashed line-contoured arrow in FIG. 4) and thus the carbon fiber further easily twines to the fine irregularities of the contact face 21, and further, the anchoring action works, and the intimacy and the heat radiation efficiency are further improved. In this manner, downsizing of the thermo conductive resin member 8, that is, downsizing of the light source unit 1 can be attained.

Moreover, in so far as the light source unit 1 and the vehicular lighting instrument 100 in the first embodiment are concerned, a heat radiation effect of the thermo conductive resin member 8 can be further improved by a heat radiation action of the resin containing carbon fiber of the thermo conductive resin member 8 (a heat emission action in which the emission coefficient of the resin containing carbon fiber is of the order of about 0.9).

In so far as the light source unit 1 and the vehicular lighting instrument 100 in the first embodiment are concerned, in the thermo conductive resin member 8, the fin portions 85 positioned in the perpendicular direction and the through gap 88 as a gap are provided when the vehicular lighting instrument 100 provided with the light source unit 1 is provided in the vehicle. As a result, a heat radiation effect of the thermo conductive resin member 8 is improved by the through gap 88 for generation of convection current in the perpendicular direction, and downsizing of the thermo conductive resin member 8, that is, downsizing of the light source unit 1 can be attained accordingly.

Moreover, in so far as the light source unit 1 and the vehicular lighting instrument 100 in the first embodiment are concerned, an upper part of a base portion between the top plate portion 80 of the thermo conductive resin member 8 and the fin portion 85 is defined as the inclined face 81. As a result, the convection heat that is generated in the though gap 88 of the thermo conductive resin member 8 is radiated to the outside along the inclined face 81 at the upper part of the base portion between the top plate portion 80 and the respective one of the fin portions 85, as indicated by the solid line-contoured arrow in FIG. 11. In this manner, a heat radiation effect of the thermo conductive resin member 8 is improved, and downsizing of the thermo conductive resin member 8, that is, downsizing of the light source unit 1 can be attained accordingly.

In so far as the light source unit 1 and the vehicular lighting instrument 100 in the first embodiment are concerned, the thermo conductive resin member 8 forms an exterior portion of the socket portion 11, and at the thermo conductive resin member 8, other than the fin portions 85, there are provided: the mounting portion 87 and the jaw portion 86 for installing the light source unit 1 in the vehicular lighting instrument 100; and the board protection wall 84 to protect the board 3. As a result, the radiation area (the emission area) for the atmosphere of the thermo conductive resin member 8 can be increased, and a heat radiation effect of the thermo conductive resin member 8 can be further improved accordingly. In this manner, downsizing of the thermo conductive resin member 8, that is, downsizing of the light source unit 1 can be attained.

In so far as the light source unit 1 and the vehicular lighting instrument 100 in the first embodiment are concerned, the thermo conductive resin member 8 forms an exterior portion of the socket portion 11, and fine irregularities 804 are provided on the exterior face of the thermo conductive resin member 8, that is, on the exterior faces of the fin portions 85, the board protection wall 84, the jaw portion 86, the mounting portion 87, and the connector engagement portion 800. As a result, a turbulence is generated in the direction as indicated by the solid line-contoured arrow in FIG. 10, by the fine irregularities 804 on the exterior face of the thermo conductive resin member 8, that is, on the exterior faces of the fin portions 85, the board protection wall 84, the jaw portion 86, the mounting portion 87, and the connector engagement portion 800. Owing to the generation of the turbulence, the heat that is transmitted from the top plate portion 80 to the fin portions 85, the board protection wall 84, the jaw portion 86, the mounting portion 87, and the connector engagement portion 800 is efficiently radiated (emitted) to the outside from the exterior faces of the fin portions 85, the board protection wall 84, the jaw portion 86, the mounting portion 87, and the connector engagement portion 800. Also, by the fine irregularities 804 on the exterior face of the thermo conductive resin member 8, the radiation (emission) area is increased, and the resultant heat is efficiently radiated (emitted) to the outside accordingly. In this manner, downsizing of the thermo conductive resin member 8, that is, downsizing of the light source unit 1 can be attained.

In so far as the light source unit 1 and the vehicular lighting instrument 100 in the first embodiment are concerned, at the socket portion 11, by downsizing the connector portion 13 on the light source side composed of the connector engagement portion 800 as a part of the thermo conductive resin member 8 and the terminals 910 to 930 as a part of the electric power feeding members 91 to 93, it is also possible to downsize dimensions in a depth direction of the light source unit 1. That is, the connector engagement portion 800 of the thermo conductive resin member 8 constituting the connector portion 13 is small in size and thus a percentage of the connector engagement portion 800 in the respective one of the fin portions 85 of the thermo conductive resin member 8 is also small. Thus, even if the recessed portion 802 of the connector engagement portion 800 is positioned in the thermo conductive resin member 8 (at the board 3 side), lowering of a heat radiation effect is minimized. In this manner, it is possible to reduce the dimensions in the depth direction of the light source unit 1 (the dimensions in the height direction of FIGS. 4 and 5 and the dimensions in the direction in which the light source unit 1 is inserted into the lamp room 105 of the vehicular lighting instrument 100).

In so far as the light source unit 1 and the vehicular lighting instrument 100 in the first embodiment are concerned, at an upper part of the connector portion 13, the tin portions 85 that is positioned in the perpendicular direction and the through gap 88 as a gap of which an upper part (an upper end part 89) opens are disposed when the vehicular lighting instrument 100 provided with the light source unit 1 is provided in the vehicle, and at a side part of the connector portion 13, the fin portions 85 positioned in the perpendicular direction and the through gap 88 as a vertically penetrating gap are disposed when the vehicular lighting device 100 provided with the light source unit 1 is provided in the vehicle. That is, at a lower side of the thermo conductive resin member 8 of the socket portion 11, the connector portion 13 is provided so as to be positioned at a lower side when the vehicular lighting device 100 provided with the light source 1 is provided in the vehicle. Thus, the through gap 88 at each of the left and right sides of the connector engagement portion 800 of the connector portion 13 penetrates from bottom to top, and the through gap 88 at the upper side of the connector engagement portion 800 of the connector 13 penetrates upward from the connector engagement portion 800. In this manner, convection current is efficiently generated, and a heat radiation effect can be improved.

In so far as the light source unit 1 and the vehicular lighting instrument 100 in the first embodiment are concerned, the insulation member 7 and the electric power feeding members 91 to 93 are integrally assembled with each other, and the thus assembled members are integrally incorporated in the thermo conductive resin portion 8 through the connector engagement portion 800. As a result, there is no need to integrally mold the insulation member 7 and the thermo conductive resin member 8 or to mold these members with two colors and thus a structure of a die is simplified, and the manufacturing costs can be saved.

In so far as the light source unit 1 and the vehicular lighting instrument 100 in the first embodiment are concerned, the insulation member 7 and the electric power feeding members 91 to 93 are integrally assembled, and the thus assembled members are integrally incorporated in the thermo conductive resin portion 8 through the connector engagement portion 800. As a result, an interface between the insulation member 7 and the thermo conductive resin member 8 is positioned in the connector engagement portion 800. The connector 14 is engaged into the connection engagement portion 800, whereby the water resistivity in the connector engagement portion 800 is ensured and thus the water resistance effect is improved.

In so far as the light source unit 1 and the vehicular lighting instrument 100 in the first embodiment are concerned, one end parts of the electric power feeding members 91 to 93 that are disposed on a lateral straight line are made of straight pins, and one end parts of the electric power feeding members 91 to 93 of these straight pins are electrically connected and mechanically mounted to the board 3 by the solder iron 62 or by way of welding and the like. As a result, the area of the board 3 can be reduced, and downsizing is possible accordingly. That is, it is possible to reduce dimensions in the lateral direction of the light source unit 1 (the dimensions in the vertical direction of FIGS. 2 and 3 or the dimensions in the transverse direction and the dimensions in the radial direction of the thermo conductive resin member 8 formed in a cylindrical shape of the light source unit 1).

In so far as the light source unit 1 and the vehicular lighting instrument 100 in the first embodiment are concerned, in respect of the gates of die molding at the time of insert molding of the thermo conductive resin member 8, the one-point gate G1 is positioned at or near the center of the other end face of the thermo conductive resin member 8, that is, at or near the center of the other end face of the respective one of the fin portions 85; the two-point gate G2 is positioned on one straight line or one substantially straight line on one end face of the thermo conductive resin member 8, that is, on one straight line or one substantially straight line on one end face of the board protection wall 84; and the two-point gate G3 is positioned on one straight line or one substantially straight line on one end face of the thermo conductive resin member 8, that is, on one straight line or one substantially straight line on one end face of the mounting portion 87. By these gates G1. G2. G3, the flow direction of the resin containing carbon fiber for molding the thermo conductive resin member 8 (the direction as indicated by the dashed line-contoured arrow in FIG. 4) is substantially coincident with the protrusion direction of the fin portions 85 in the fin portions 85 (the direction as indicated by the dashed line-contoured arrow in FIG. 4) and is substantially coincident with the facial direction of the top plate portion 80 in the top plate portion 80 (the direction that is substantially perpendicular to the direction as indicated by the dashed line-contoured arrow in FIG. 4). As a result, a heat radiation route of the thermo conductive resin member 8 and the longitudinal direction of carbon fiber of the thermo conductive resin member 8 are substantially coincident with each other and thus the heat radiation efficiency can be improved.

In particular, in the one-point gate G1, as shown in FIGS. 2 and 4, among the fin portions 85 of the thermo conductive resin member 8, the portion 83 communicating with the connector engagement portion 800 as a part of the thermo conductive resin member 8 constituting the connector portion 13 is clipped. Thus, in the flow of the resin containing carbon fiber, it is possible to prevent generation of the flow in the direction that is substantially orthogonal to the protrusion direction of the respective one of the fin portions 85 (the direction as indicated by the dashed line-contoured arrow in FIG. 4), via the connector engagement portion 800. In this manner, the flow of the resin containing carbon fiber is in the protrusion direction of the respective one of the fin portions 85 (the direction as indicated by the dashed line-contoured arrow in FIG. 4) and thus a heat radiation route in the respective one of the fin portions 85 of the thermo conductive resin member 8 and the longitudinal direction of carbon fiber of the thermo conductive resin member 8 are substantially coincident with each other, and the heat radiation efficiency can be improved.

In so far as the light source unit 1 and the vehicular lighting instrument 100 in the first embodiment are concerned, the two-point gates G2, G3 are positioned to be upper than the contact face 21 of the metallic body 2 at the time of molding of the thermo conductive resin member 8. Thus, at the time of molding of the thermo conductive resin member 8, it is possible to prevent generation of an interface in the flow of the resin containing carbon fiber, and the thermal conductivity can be maintained without lowering it accordingly.

Second Embodiment

Figure 12:
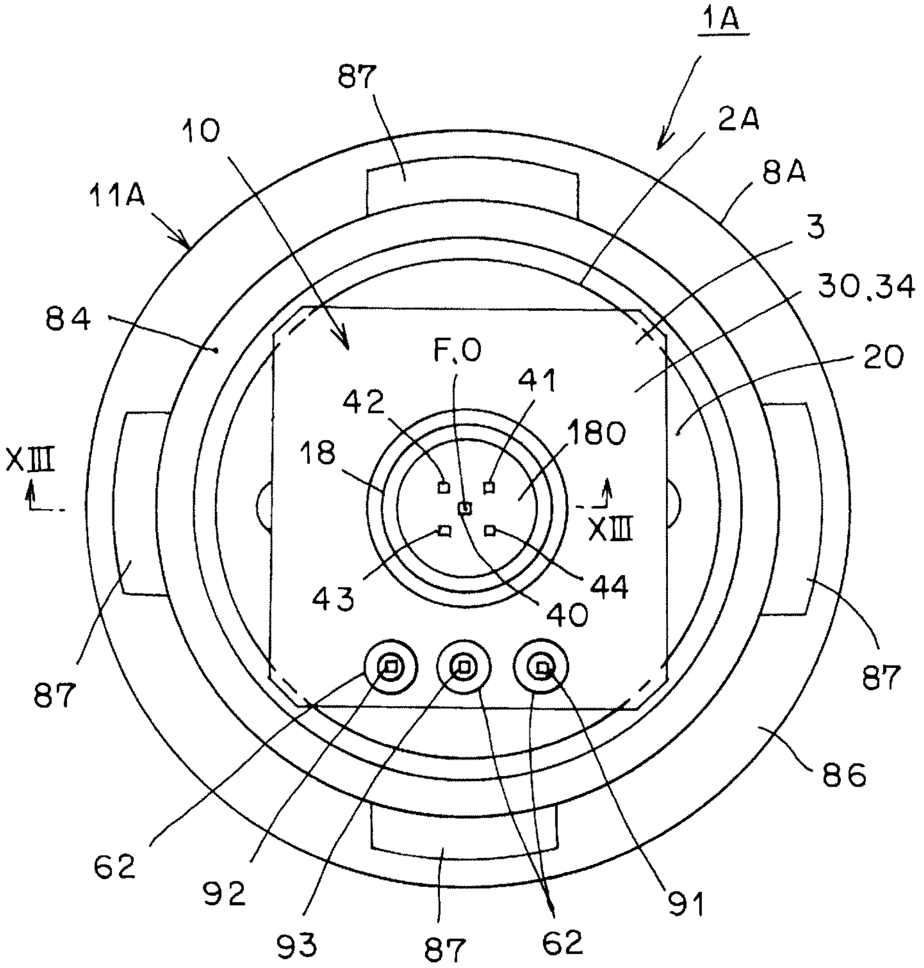
FIG. 12 shows a second embodiment of a vehicular lighting instrument semiconductor light source light source unit according to the present invention and a second embodiment of the vehicular lighting instrument according to the present invention, and is also a transverse sectional view (a horizontal sectional view) of a state in which the light source unit is assembled to the vehicular lighting instrument.
Figure 13:
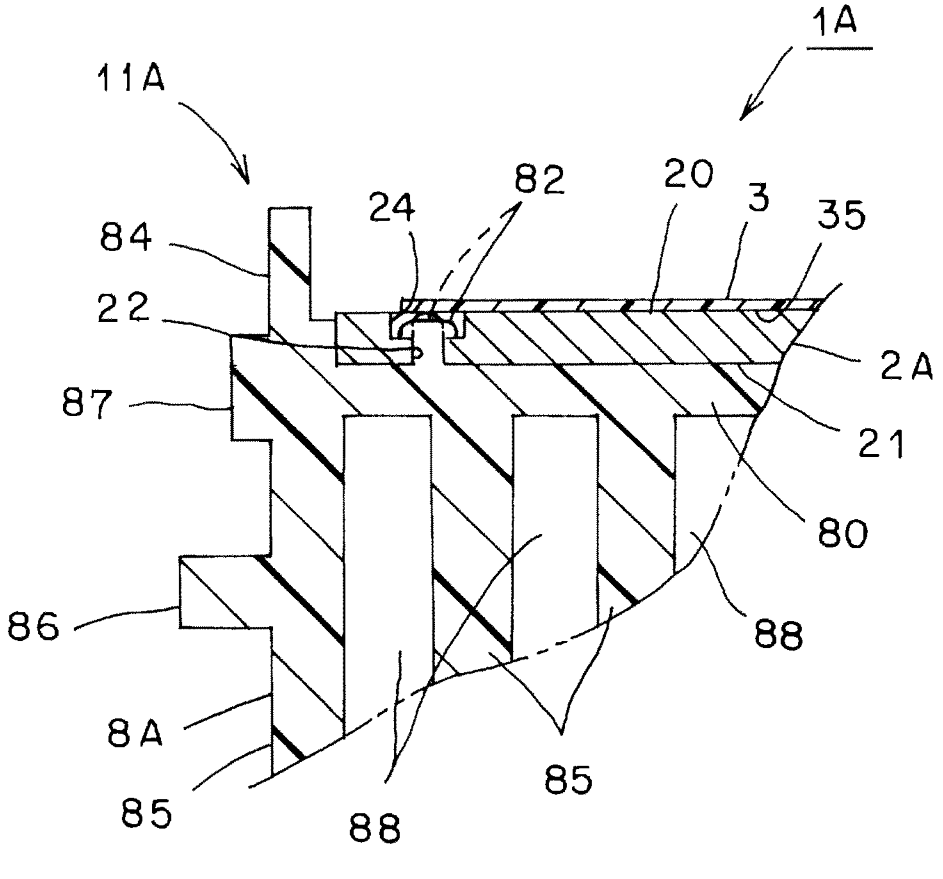
FIG. 13 is a sectional view taken along the line XIII-XIII in FIG. 12.

FIGS. 12 and 13 show a second embodiment of a vehicular lighting instrument semiconductor light source light source unit according to the present invention and a second embodiment of the vehicular lighting instrument according to the present invention. Hereinafter, a description will be furnished with respect to the light source unit of the semiconductor light source of the vehicular lighting instrument in the second embodiment and the vehicular lighting instrument in the second embodiment (hereinafter, referred to as “the light source unit and the vehicular lighting instrument in the second embodiment”). In the figures, same reference numerals assigned in FIGS. 1 to 11 designate same constituent elements.

The light source unit 1 in the first embodiment mentioned above is formed by insert molding the metallic body 2 of the socket portion 11 in the thermo conductive resin member 8. A light source unit 1A in the second embodiment is integrally assembled after a metallic body 2A of a socket portion 11A and a thermo conductive resin member 8A has been respectively molded separately.

That is, a pin 82 is integrally protrusively provided on one face of a top plate portion 80 of a thermo conductive resin member 8A that is molded by a thermo conductive resin. On the other hand, at a metallic body 2A molded by aluminum, a hole 22 and a recessed portion 24 are provided in correspondence with the pin 82. The metallic body 2A is placed on one face of the top plate portion 80 of the thermo conductive resin member 8A, and the pin 82 of the thermo conductive resin member 8A is inserted into the hole 22 of the metallic body 2A and then the thus inserted pin is positioned in the recessed portion 24. The pin 82 is swaged in a state as indicated by the solid line from a state as indicated by the dashed line by thermal welding deposition or ultrasonic welding deposition; the metallic body 2A and a contact face 21 are integrally assembled to each other; and a socket portion 11A is constructed. Between the contact face 21 of the metallic body 2A and the thermo conductive resin member 8A, a thermo conductive grease or the like (not shown) is interposed. In this manner, the contact face 21 of the metallic body 2A and the thermo conductive resin member 8A come into intimate contact with each other, making it possible to prevent a pneumatic air layer from being formed between the contact face 21 of the metallic body 2A and the thermo conductive resin member 8A, and making it possible to maintain a thermal conductivity without lowering it. It is to be noted that a groove with a circumference which is one-turn smaller than a full circumference of the contact face 21 of the metallic body 2A is provided at the thermo conductive resin member 8A, thereby making it possible to preventing the thermo conductive grease or the like from overflowing from a gap between the contact face 21 of the metallic body 2A and the thermo conductive resin member 8A.

The light source unit 1A and the vehicular lighting instrument 100 in the second embodiment are capable of achieving functions and advantageous effects which are substantially similar to those of the light source unit 1 and the vehicular lighting instrument 100 in the first embodiment mentioned above. In particular, in so far as the light source unit 1A and the vehicular lighting instrument in the second embodiment are concerned, the socket portion 11A, the metallic body 2A, and the thermo conductive resin member 8A are respectively molded separately and then are assembled to each other and thus the manufacturing tact can be reduced, and moreover, the manufacturing costs are saved, and the durability of a die can be improved.

Third Embodiment

Figure 14:
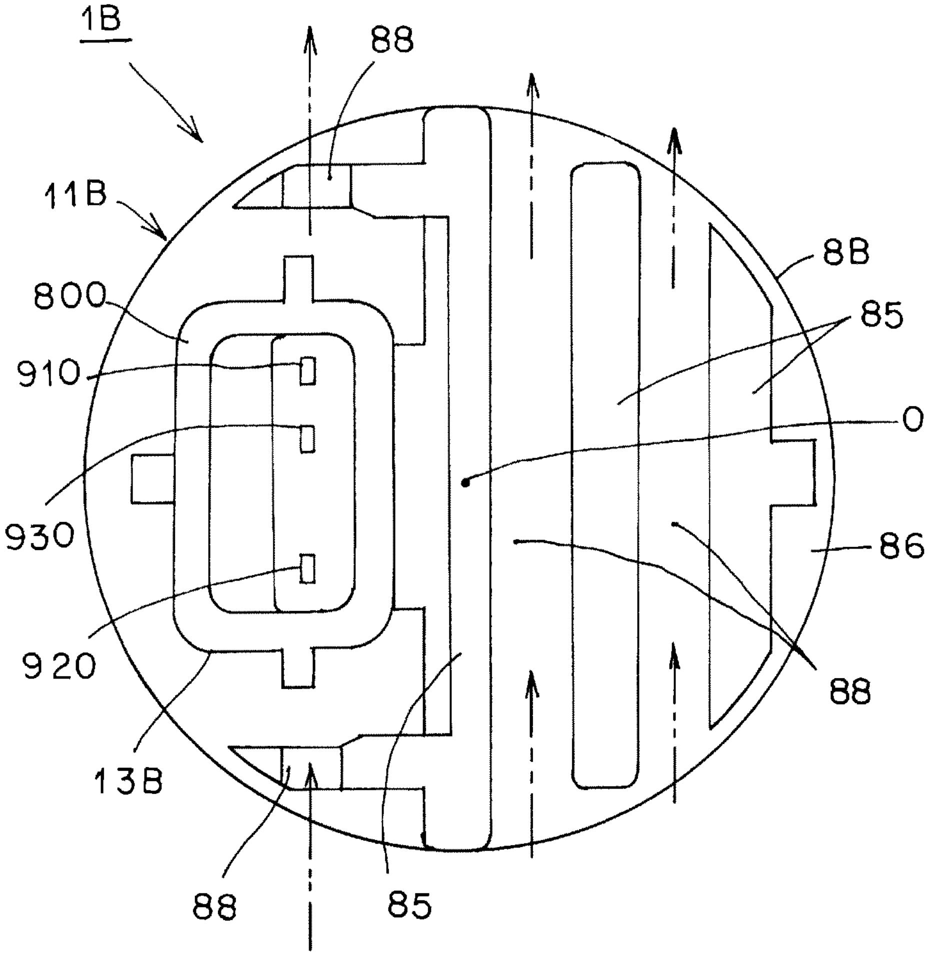
FIG. 14 shows a third embodiment of a vehicular lighting instrument semiconductor light source light source unit according to the present invention and a third embodiment of the vehicular lighting instrument according to the present invention, and is also a transverse sectional view (a horizontal sectional view) of a state in which the light source unit is assembled to the vehicular lighting instrument.

FIG. 14 shows a third embodiment of a vehicular lighting instrument semiconductor light source light source unit according to the present invention and a third embodiment of the vehicular lighting instrument according to the present invention. Hereinafter, a description will be furnished with respect to the light source unit of the semiconductor light source of the vehicular lighting instrument in the third embodiment and the vehicular lighting instrument in the third embodiment (hereinafter, referred to as “the light source unit and the vehicular lighting instrument in the third embodiment”). In the figure, same reference numerals assigned in FIGS. 1 to 13 designate same constituent elements.

The light source unit 1 in the first embodiment mentioned previously provides a connector portion 13 of an intensive water resistance connector at a lower site of the thermo conductive resin member 8 of the socket portion 11 (at the lower site when the vehicular lighting instrument 100 provided with the light source unit 1 is provided in the vehicle). On the contrary to this, a light source 1B in the third embodiment provides a connector portion 13B of a water resistance connector at a lateral side of a thermo conductive resin member 8B of a socket portion 11B (at the lateral side (at the left side in FIG. 14) when the vehicular lighting instrument provided with the light source unit 1B is provided in the vehicle).

The light source unit 1B and the vehicular lighting instrument in the third embodiment is capable of achieving functions and advantageous effects which are substantially similar to those of the light source unit 1 and the vehicular lighting instrument 100 in the first embodiment mentioned above. In particular, in so far as the lighting source unit 1B and the vehicular lighting instrument in the third embodiment are concerned, the connector portion 13B is slightly increased in size, whereby the connector portion can be slightly increased in comparison with the connector portion 13 of the light source 1 and the vehicular lighting instrument 100 in the first embodiment mentioned previously, and a tensile stress can be increased accordingly.

Forth Embodiment

A vehicular lighting instrument semiconductor light source light source unit 100 according to a fourth embodiment of the present invention will be described with reference to FIGS. 15 to 23. The light source unit of the semiconductor light source of the vehicular lighting instrument 100 according to the fourth embodiment is embodied in order to realize the second embodiment described previously in which the metallic body 2A of the socket portion 11A and the thermo conductive resin member 8A are respectively molded separately and then the thus molded elements are integrally assembled to each other. In the figures, same reference numerals and same nomenclatures assigned in FIGS. 1 to 14 designate same constituent elements.

Figure 15:
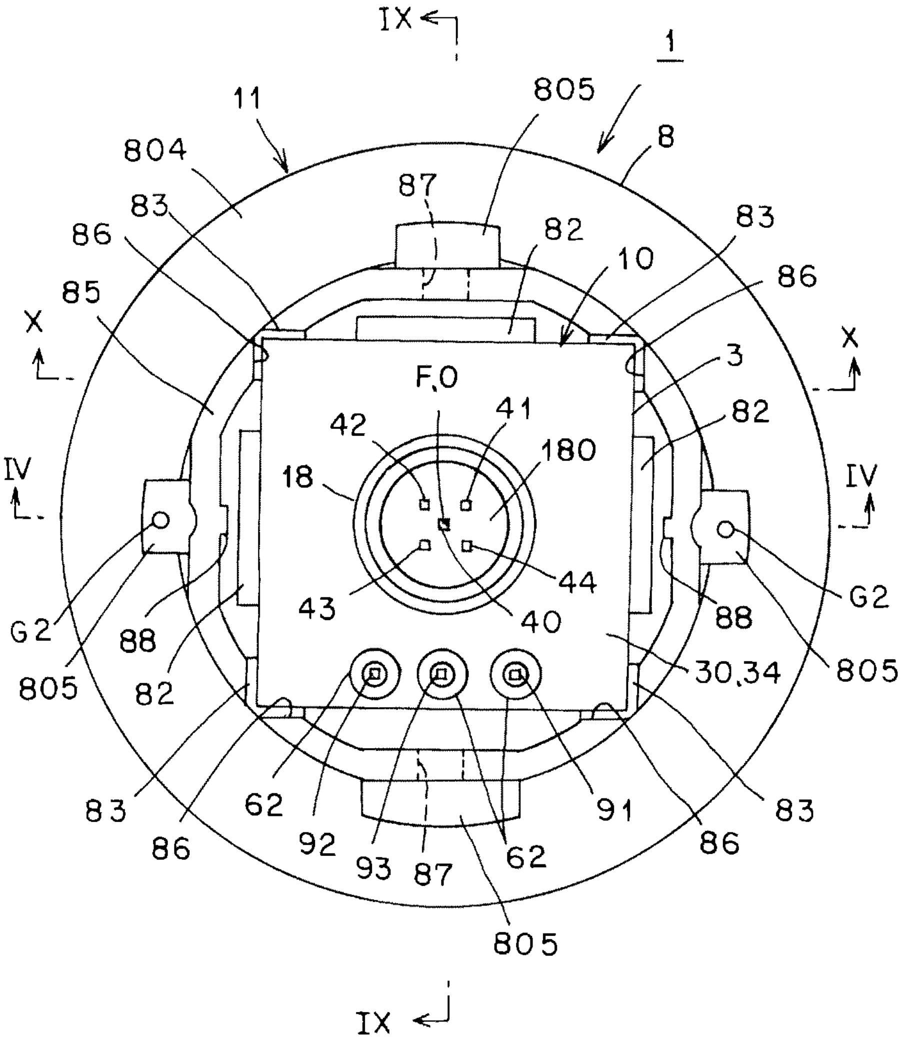
FIG. 15 is a plan view showing a state in which a light source portion and a socket portion of a light source unit in a light source unit of a semiconductor light source according to a fourth embodiment of the present invention are assembled to each other.
Figure 16:
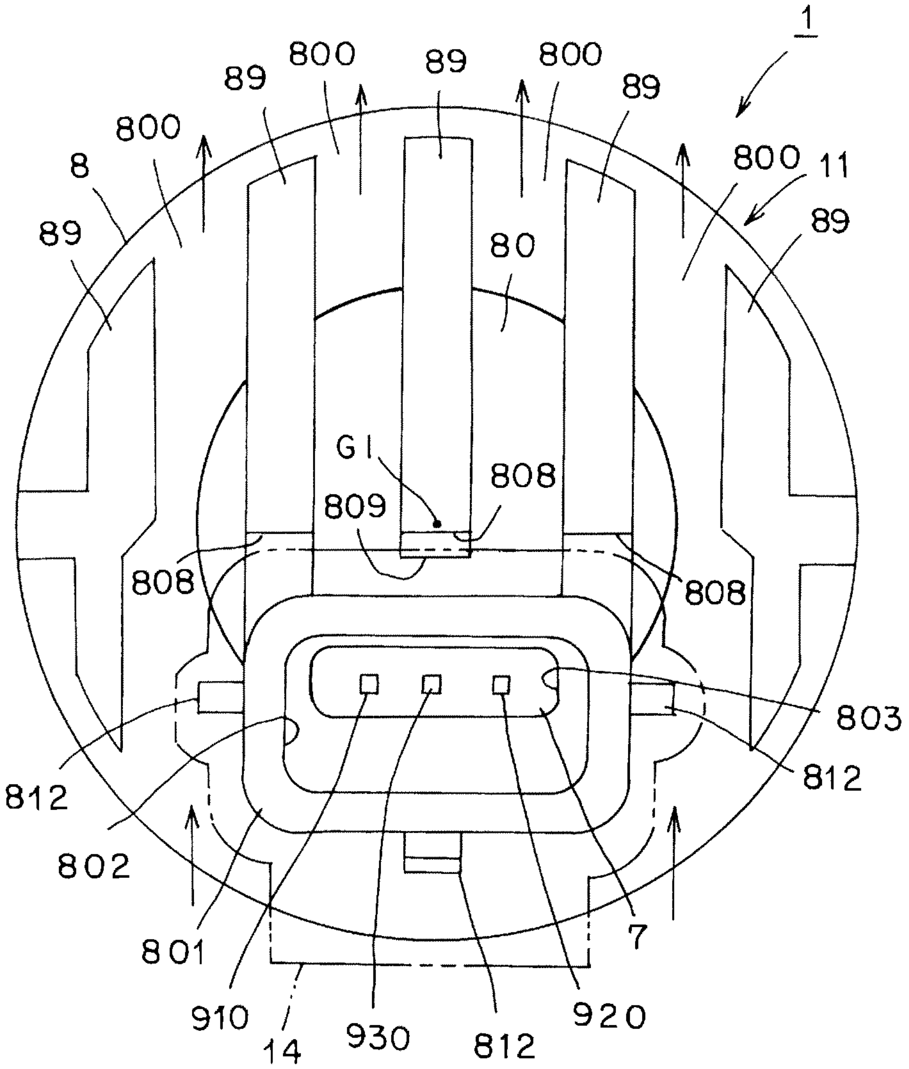
FIG. 16 is a rear view of a state in which the light source portion and the socket portion of the light source unit in the light source unit of the semiconductor light source according to the fourth embodiment of the present invention are assembled to each other.
Figure 17:
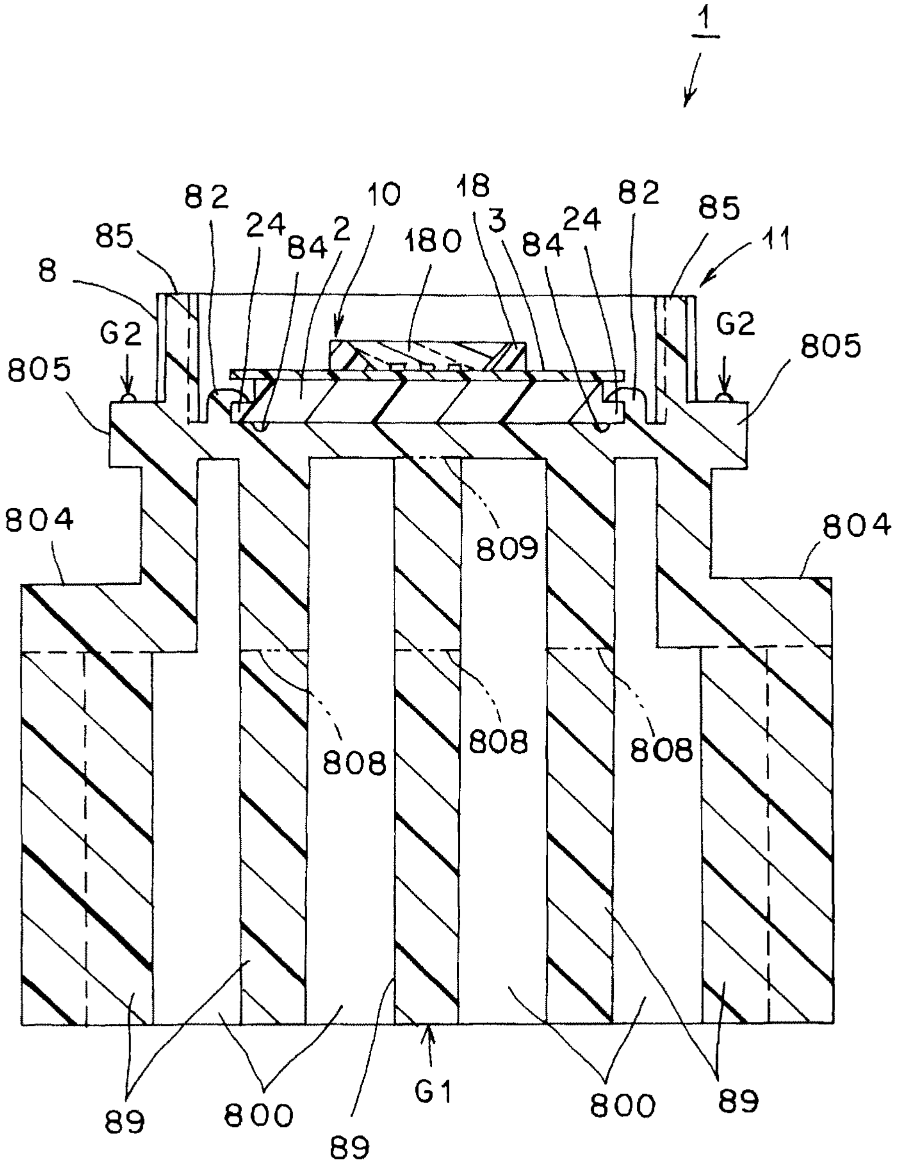
FIG. 17 is a sectional view taken along the line IV-IV in FIG. 15.
Figure 18:
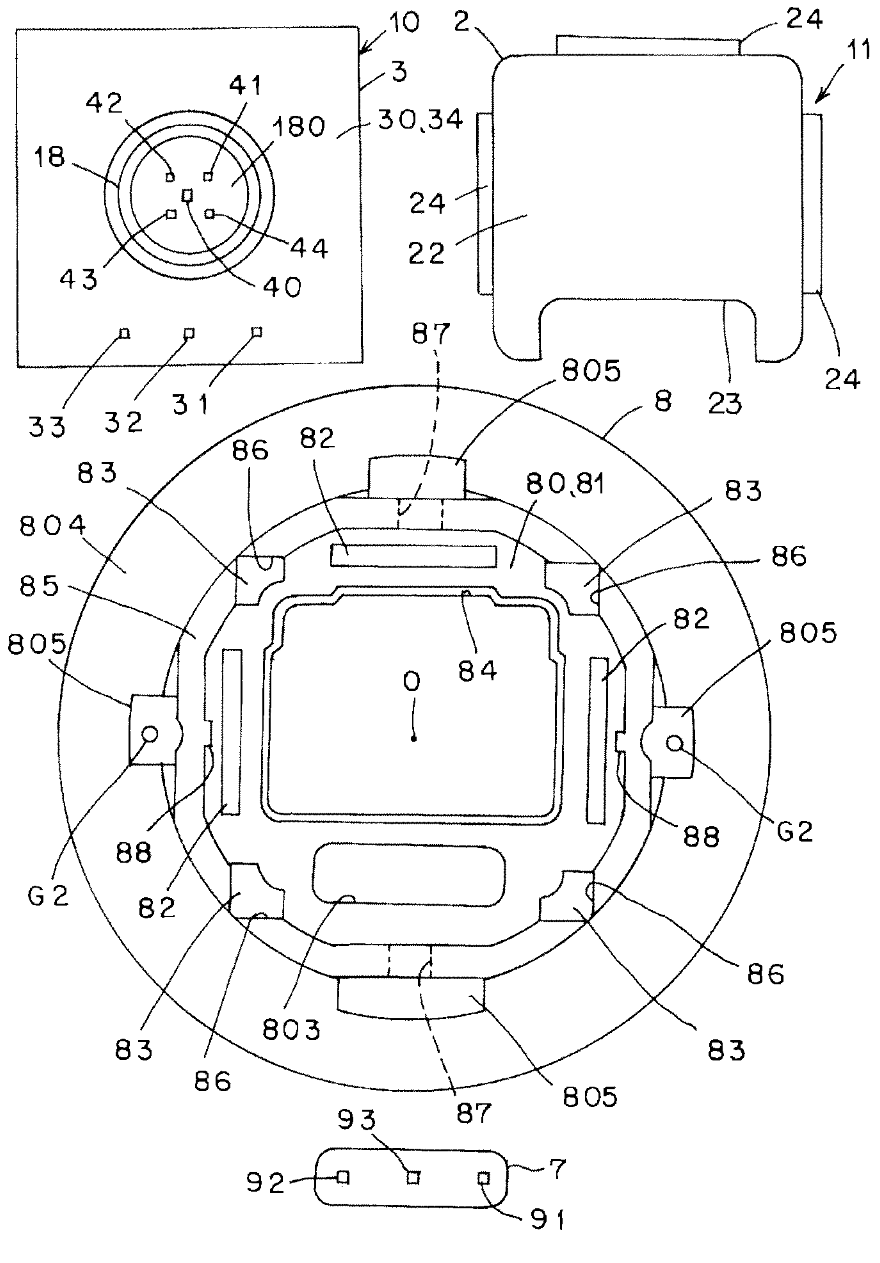
FIG. 18 is a plan view showing an exploded state of the light source portion and the socket portion (the thermo conductive resin member, the electric power feeding member and the insulation member, and the metallic body) of the light source unit in the light source unit of the semiconductor light source according to the fourth embodiment of the present invention.
Figure 19:
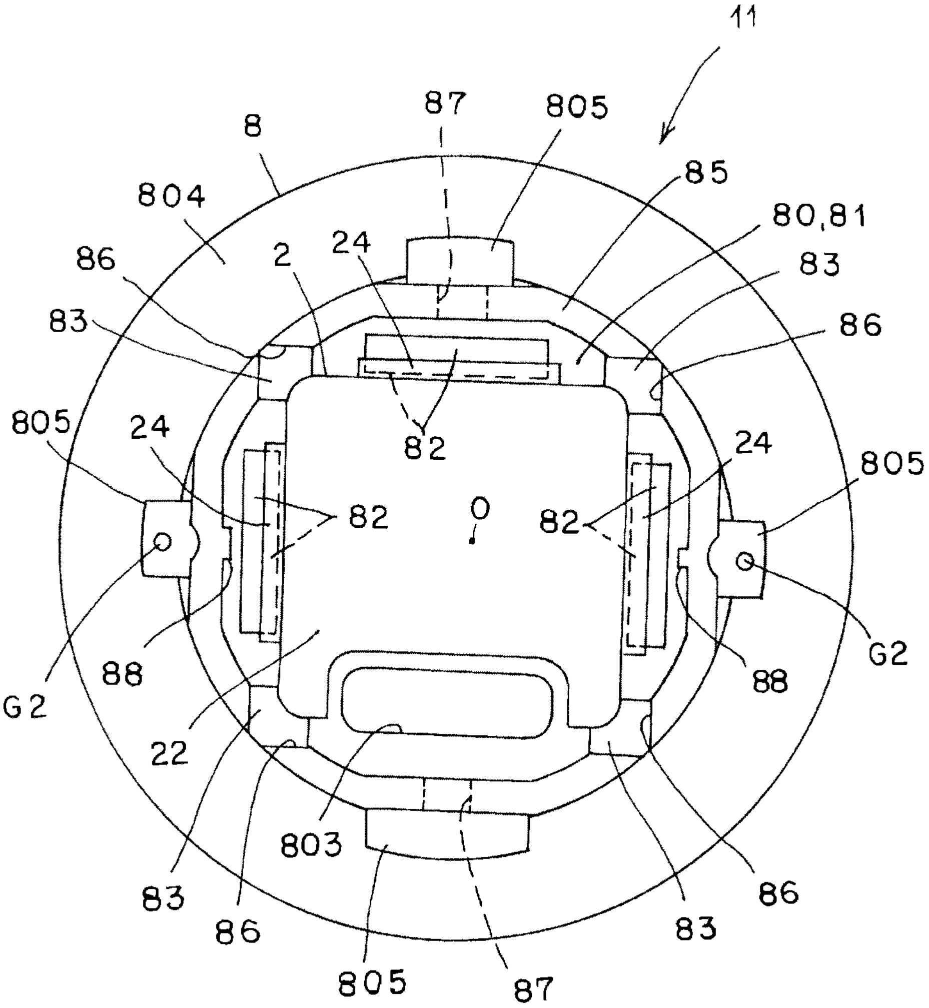
FIG. 19 is a plan view showing a state in which the thermo conductive resin member and the metallic body of the socket portion are assembled to each other in the light source unit of the semiconductor light source according to the fourth embodiment of the present invention.
Figure 20:
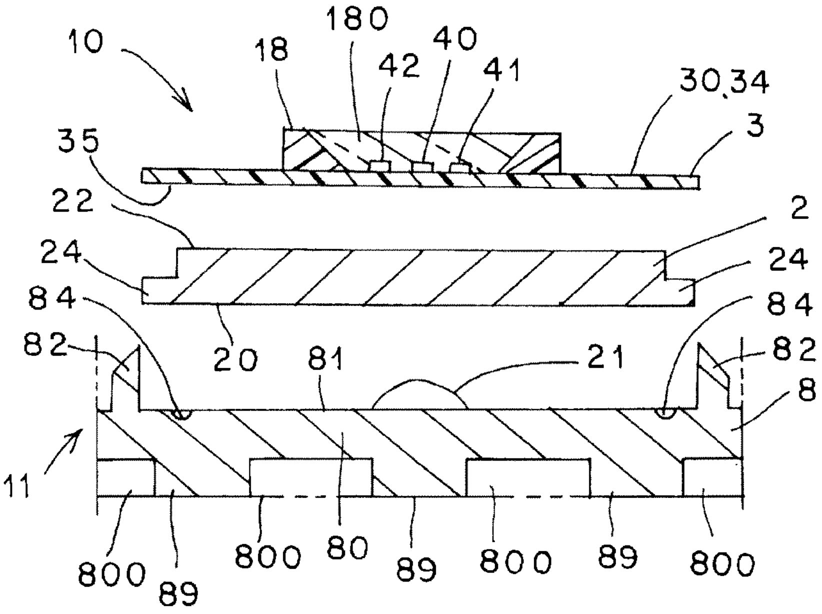
FIG. 20 is a partial sectional view (the sectional view corresponding to FIG. 17) showing an exploded state of the light source portion and the socket portion (the thermo conductive resin member, the electric power feeding member and the insulation member, and the metallic body) of the light source unit in the light source unit of the semiconductor light source according to the fourth embodiment of the present invention.
Figure 21:
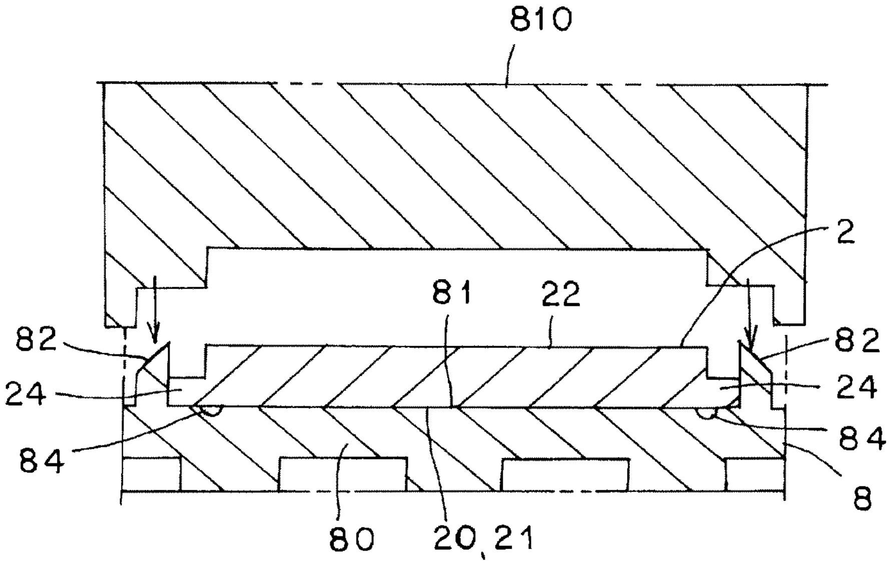
FIG. 21 is a partial sectional view (a sectional view corresponding to FIG. 17) showing a state in which the metallic body is secured, by ultrasonic welding deposition, to the thermo conductive resin member of the socket portion in the light source unit of the semiconductor light source according to the fourth embodiment of the present invention.
Figure 22:
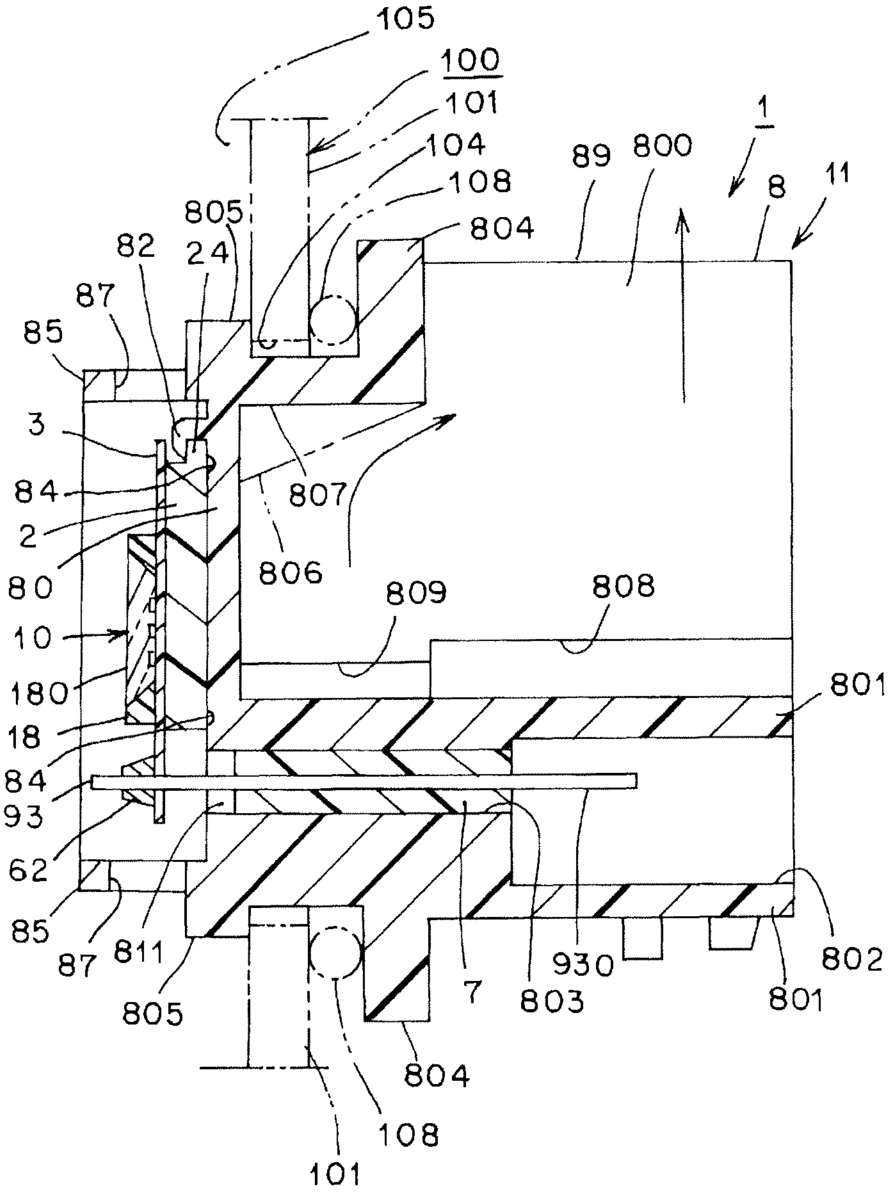
FIG. 22 is a sectional view taken along the line IX-IX in FIG. 15.
Figure 23:
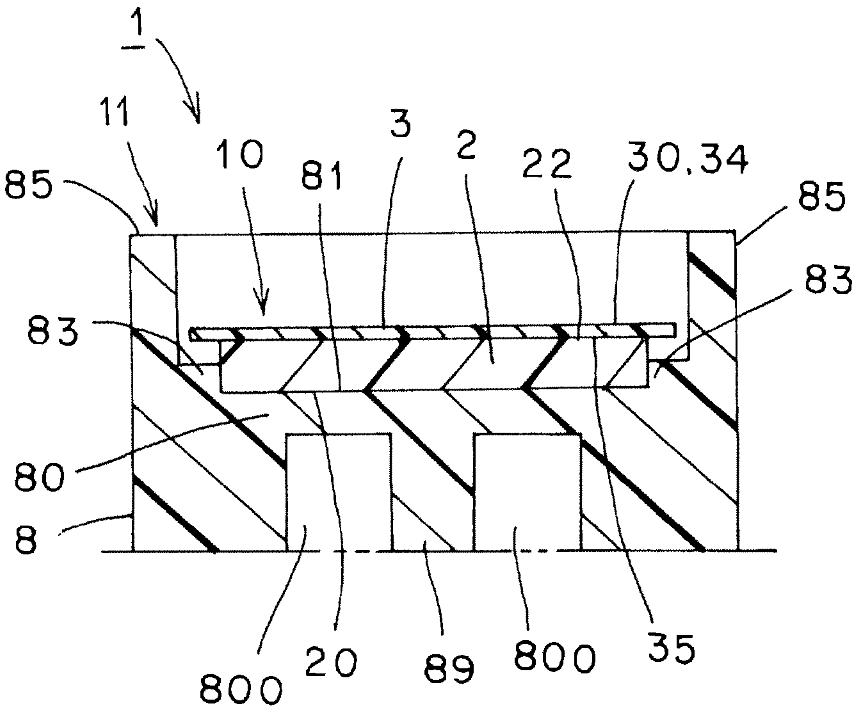
FIG. 23 is a sectional view taken along the line X-X in FIG. 15.

FIGS. 15 to 23 show the light source unit of the semiconductor light source of the vehicular lighting instrument according to the fourth embodiment of the present invention. FIG. 15 is a plan view showing a state in which a light source portion and a socket portion of a light source unit in a light source unit of a semiconductor light source according to a fourth embodiment of the present invention are assembled to each other. FIG. 16 is a rear view of a state in which the light source portion and the socket portion of the light source unit in the light source unit of the semiconductor light source according to the fourth embodiment of the present invention are assembled to each other. FIG. 17 is a sectional view taken along the line IV-IV in FIG. 15. FIG. 18 is a plan view showing an exploded state of the light source portion and the socket portion (the thermo conductive resin member, the electric power feeding member and the insulation member, the metallic body) of the light source unit in the light source unit of the semiconductor light source according to the fourth embodiment of the present invention. FIG. 19 is a plan view showing a state in which the thermo conductive resin member and the metallic body of the socket portion are assembled to each other in the light source unit of the semiconductor light source according to the fourth embodiment of the present invention. FIG. 20 is a partial sectional view (the sectional view corresponding to FIG. 17) showing an exploded state of the light source portion and the socket portion (the thermo conductive resin member, the electric power feeding member and the insulation member, the metallic body) of the light source unit in the light source unit of the semiconductor light source according to the fourth embodiment of the present invention. FIG. 21 is a partial sectional view (the sectional view corresponding to FIG. 17) showing a state in which the metallic body is secured by way of ultrasonic welding deposition, to the thermo conductive resin member of the socket portion in the light source unit of the semiconductor light source according to the fourth embodiment of the present invention. FIG. 22 is a sectional view taken along the line IX-IX in FIG. 15. FIG. 23 is a sectional view taken along the line X-X in FIG. 15.

(Metallic Body 2)

The metallic body 2, as shown in FIGS. 17 to 23, in this example, forms a shape of an aluminum plate, and is molded by way of press processing. A securing face 20 as one face of the metallic body 2 is secured to the thermo conductive resin member 8 via a grease (a thermo conductive grease) 21. With an abutment face 22 as the other face of the metallic body 2, the abutment face 35 of the board 3 comes into contact, via thermo conductive medium, although not shown (such as a thermo conductive adhesive bond or a thermo conductive grease, for example).

The metallic body 2 forms a substantial square shape when it is seen from a front side. Four corners of the metallic body 2 form arc shapes. At one edge of an outer circumferential edge of the metallic body 2 (the edge to which the respective one of the electric power feeding members 91 to 93 corresponds), there is provided an avoidance recessed portion 23 to avoid the electric power feeding members 91 to 93. At a center part of three edges other than the avoidance recessed portion 23 at the outer circumferential edge of the metallic body 2, a rectangular securing portion 24 is integrally provided. One face of the securing portion 24 is in flush with the securing face 20, and the other face of the securing portion 24 is stepped with respect to the abutment face 22.

(Insulation Member 7)

The insulation member 7, as shown in FIGS. 16, 18, and 22, sheaths an intermediate part as a part of the electric power feeding members 91 to 93, and assembles the thermo conductive resin member 8 and the electric power feeding members 91 to 93 in a state in which these members are insulated from each other. The insulation member 7 is made of an insulation resin member, for example. One end parts of the electric power feeding members 91 to 93 protrude from one edge face of the insulation member 7. The other end parts of the electric power feeding members 91 to 93 protrude from the other end face of the insulation member 7.

(Thermo Conductive Resin Member 8)

The thermo conductive resin member 8, as shown in FIGS. 15 to 23, radiates a heat which is generated at the light source portion 10 to the outside via the metallic body 2. The thermo conductive resin member 8 is composed of a thermo conductive resin, for example, a resin containing carbon fiber (short carbon fiber), or alternatively, carbon granule, or alternatively, a mixture of carbon fiber and carbon granule. The thermo conductive resin member 8, in this example, is composed of an insert molded article of a resin containing at least carbon fiber.

The thermo conductive resin member 8 forms a substantially cylindrical shape of which an outer diameter is slightly smaller than an inner diameter of the through hole 104 of the lamp housing 101. The metallic body 2 that is molded separately from the thermo conductive resin member 8 is secured to a securing face 81 as one face of the top plate 80 at one end part of the thermo conductive resin member 8 (a frontal end part and an end part at the site at which the light source portion 10 is mounted).

On the securing face 81 of the top plate portion 80, three rectangular securing ribs 82 are integrally provided in correspondence with the three securing portions 24 of the metallic body 2. On the securing face 81 of the top plate portion 80, four positioning protrusion portions 83 are integrally provided in correspondence with four corners of the metallic body 2. Interior faces of the four positioning protrusion portions 83 form arc shapes in accordance with arc shapes of four corners of the metallic body 2. The positioning protrusion portion 83 and the four corners of the metallic body 2 constitute a positioning portion to determine a mutual position between the thermo conductive resin member 8 and the metallic body 2. Of the securing face 81 of the top plate 80, inside of the three securing ribs 82 and the four positioning protrusion portions 83, a substantial square, circumferential groove 84 is provided. The substantial square, circumferential groove 84 is one-turn smaller than an outer circumferential edge of the metallic body 2.

At an outer circumference of the top plate 80, a circular ring-shaped board protection wall 85 is integrally provided so as to surround the metallic body 2 and the board 3. As a result, the board 3 is housed in the board protection wall 85, and is protected by the board protection wall 85.

Of the board protection wall 85, at a site at which a respective one of the four corners of the square board 3 is positioned, a cutout 86 is provided. The cutout 86 is provided at a depth up to one face of the positioning protrusion portion 83. As a result, a valley face of the cutout 86 and one face of the positioning protrusion portion 83 are in flush with each other, are remarkably high than the securing face 81 of the top plate 80, and remarkably lower than one face of the board protection wall 85.

At the top and bottom and the left and right of the board protection wall 85, two mounting holes 87 and two guide protrusion portions 88 are respectively provided. Widths of the two left and right guide protrusion portions 88 are different from each other in order to prevent incorrect assembling.

At the other end of the thermo conductive resin member 8 (at a rear end part and an opposite end part to an end part at the side at which the light source portion 10 is mounted), a plurality of heat radiation fin portions 89 are integrally provided. That is, the fin portions 89 are integrally provided from the other face of the top plate portion 80. A longitudinal direction of the fin portions 89, as shown in FIGS. 16 and 22, is positioned in a perpendicular direction (a vertical direction) when the vehicular lighting instrument 100 provided with the light source unit 1 is provided in a vehicle (not shown).

Between a plurality of the fin portions 89, a plurality of gaps, through gaps 800 for generation of convection current are provided. The through gaps 800 are positioned in the perpendicular direction (the vertical direction) when the vehicular lighting instrument 100 provided with the light source unit 1 is provided in the vehicle. Upper end parts of the through gaps 800 are opened.

At a lower side of the fin portions 89 at the other end part of the thermo conductive resin portion 8, that is, at a lower center part when the vehicular lighting instrument 100 provided with the light source unit 1 is provided in the vehicle, a connector portion 801 is integrally provided. The connector engagement portion 801 forms a hollowed rectangular shape. As a result, the through holes 800 at both of the left and right sides of the connector engagement portion 801 penetrate from bottom to top. On the other hand, the through gaps 800 at the upper side of the connector engagement portion 801 penetrate upper from the connector engagement portion 801.

As shown in FIGS. 18, 19, and 22, inside of the thermo conductive resin member 8, a mounting through hole 803 is provided at a portion between the top plate portion 80 and a recessed portion 802 of the connector engagement portion 801. Into the mounting through hole 803, the insulation member 7 in which the electric power feeding members 91 to 93 are integrally incorporated is inserted, and the inserted member is secured to the top plate portion 80 through the recessed portion 802 of the connector engagement portion 801.

As a result, the thermo conductive resin member 8 and the electric power feeding members 91 to 93 are integrally incorporated in a state in which these members are insulated from each other via the insulation member 7. That is, between the thermo conductive resin member 8 and a respective one of the electric power feeding members 91 to 93, the insulation member 7 is interposed. The thermo conductive resin member 8 comes into intimate contact with the insulation member 7. The electric power feeding members 91 to 93 come into intimate contact with the insulation member 7.

On an outer circumferential face of an intermediate part of the thermo conductive resin member 8, there is integrally provided a disk-shaped jay portion 804 to bring the packing 108 into pressure contact with the lamp housing 101 (refer to FIGS. 1 and 22). On the outer circumferential face of the intermediate part of the thermo conductive resin member 8, a plurality of, in this example, four mounting portions 805 are caused to correspond to the recessed portions of the lamp housing 101, and are integrally provided opposite to the jaw portion 804.

The jaw portion 804 and the four mounting portions 805 constitute a mounting portion for providing the light source unit 1 in the vehicular lighting instrument 100. That is, a part on the cover portion 12 side of the socket portion 11 and the mounting portions 805 are respectively inserted into the though hole 104 and the recessed portions of the lamp housing 101. In that state, the socket portion 11 is rotated about a central O-axis, and the mounting portions 805 are abutted against the stopper portion of the lamp housing 101. At this point of time, the mounting portions 805 and the jaw portion 804 pinch, from upper and lower sides, an edge part of the through hole 104 of the lamp housing 101 via the packing 108 (refer to FIGS. 1 and 22).

As a result, the socket portion 11 of the light source unit 1, as shown in FIGS. 1 and 22, is movably or securely mounted to the lamp housing 101 of the vehicular lighting instrument 100 via the packing 108. At this point of time, as shown in FIGS. 1 and 22, a portion protruding to the outside from the lamp housing 101 of the socket portion 11 (a portion which is lower than the lamp housing 101 in FIG. 1) is larger than a portion which is housed in the lamp room 105 of the socket portion 11 (an portion which is upper than the lamp housing 101 in FIG. 1).

The thermo conductive resin member 8 forms an exterior portion (an outside portion) of the socket portion 11. As shown in FIG. 23, on the exterior face of the thermo conductive resin member 8 (the exterior faces of the board protection wall 85, the fin portions 89, the connector engagement portion 801, the jaw portion 804, and the mounting portions 805), fine irregularities (not shown) are provided.

Here, as shown in FIG. 22, an upper part of a base portion between the top plate portion 80 and the tin portions 89 of the thermo conductive resin member 8 (the upper part when the vehicular lighting instrument 100 provided with the light source unit 1 is provided in a vehicle (not shown) may be an inclined face 806 as indicated by the double-dotted chain line. In this manner, a convection current, as indicated by the arrow contoured by the double-dotted chain line in FIG. 22, is generated. In this manner, a heat radiation effect is improved.

That is, if the thickness of the top plate portion 80 is substantially equal to the thickness of the fin portion 89, the longitudinal direction of carbon fiber in the thermo conductive resin member 8 and the heat transmission direction (a heat radiation route) are substantially coincident with each other, the heat radiation efficiency is improved. However, a depth of a horizontal face 807 at an upper part of a base portion between the top plate portion 80 and the respective one of the fin portions 89 increases, and thus, in the horizontal face 807, a convection current is prone to stagnate. Therefore, as mentioned previously, the horizontal face 807 may be an inclined face 806.

As shown in FIGS. 16, 17, and 22, among a total of the three fin portions 89 at the center and at both of the left and right sides, part of a portion communicating with the connector engagement portion 801 is clipped. As a result, at the portion communicating the connector engagement portion 801 of the fin portions 89, a first gap 808 is formed.

(Gates G1, G2 of Thermo Conductive Resin Member 8)

The thermo conductive resin member 8, in this example, is composed of an insert molded article of a resin containing carbon fiber. In respect of the gates of molding die (not shown) at the time of insert molding of the thermo conductive resin member 8, in this example, a one-point gate G1 or a two-point gate G2 is provided as shown in FIG. 17.

The one-point gate G1 is positioned at or near a center on the other end of the thermo conductive resin member 8 (a center (a mounting rotation center) O of the socket portion 11), that is, at or near a center of the other end face of the central fin portion 89 of the five fin portions 89. In the one-point gate G1, of the central fin portion 89 at which the one-point gate G1 is positioned, a portion communicating with the connector engagement portion 801 is clipped at or near the other end face of the top plate portion 80 (a valley face of the fin portion 89). As a result, at the portion communicating the connector engagement portion 801 of the center tin portion 89, a second gap 809 is formed.

The two-point gate G2 is positioned on one straight line or one substantially straight line passing through the center O of the socket portion 11 on one end face of the thermo conductive resin member 8. That is, the two-point gate G2 is positioned on one straight line or one substantially straight line on one end face of the mounting portion 805. One end face of the mounting portion 805 is positioned to be upper than the securing face 20 of the metallic body 2 at the time of molding of the thermo conductive resin member 8. As a result, the two-point gate G2 is positioned to be upper than the securing face 20 of the metallic body 2 at the time of molding of the thermo conductive resin member 8.

By the gates G1, G2, the flow direction of a resin containing carbon fiber for molding the thermo conductive resin member 8 (the direction as indicated by the solid line-contoured arrow of the gates G1, G2 in FIG. 17) is substantially coincident with a protrusion direction of the fin portion 89 in the fin portions 89, and is substantially coincident with a facial direction of the top plate portion 80 in the top plate portion 80 (the direction that is substantially orthogonal to the direction as indicated by the solid line-contoured arrow of the gates G1, G2 in FIG. 17). As a result, the heat radiation route of the thermo conductive resin member 8 and the longitudinal direction of carbon fiber of the thermo conductive resin member 8 are substantially coincident with each other and thus the heat radiation efficiency can be improved. It is to be noted that installation sites and the number of settings of the gates are not limited in particular.

(Securing Between Thermo Conductive Resin Member 8 and Metallic Body 2)

Hereinafter, securing between the thermo conductive resin member 8 and the metallic body 2 that are respectively molded separately will be described. First, the grease 21 is applied by a predetermined quantity which is managed by a dispenser (not shown) on the securing face 81 of the top plate 80 of the thermo conductive resin member 8 and at one site (an approximate center) of the inside that is surrounded by the groove 84 (refer to FIG. 20). It is to be noted that the grease 21 may be applied by a predetermined quantity at a plurality of sites in place of one site.

Next, the securing face 20 of the metallic body 2 is placed on the securing face 81 of the top plate 80 to which the grease 21 is applied. At this time, the metallic body 2 is positioned by the positioning protrusion portion 83 of the thermo conductive resin member 8. Next, an ultrasonic horn 810 is abutted against a securing rib 82 of the thermo conductive resin member 8 (refer to FIG. 21).

Then, by an ultrasonic wave welding deposition action of the ultrasonic horn 810, the securing rib 82 is swaged on the other face of the securing portion 24 that is stepped with respect to the abutment face 22 of the metallic body 2 (refer to FIG. 17, the dashed line in FIG. 19, and FIG. 22). Afterwards, the grease 21 on the securing face 81 of the top plate portion 80 is spread out and drawn out thinly and uniformly by the securing face 20 of the metallic body 2. At this time, redundant grease 21 of the grease 21 that is spread out gathers in the groove 84. In this manner, the grease 21 overflows from a gap between the securing face 81 of the top plate portion 80 and the securing face 20 of the metallic body 2, and the adherence of dust or an obstruction in curing of another adhesive bond or the like can be prevented. From the foregoing description, the securing face 81 of the top plate portion 80 and the securing face 20 of the metallic body 2 come into intimate contact with each other via the grease 21 so that a pneumatic air layer does not exist. In this manner, the thermo conductive resin member 8 and the metallic body 2 that are respectively molded separately are secured to each other. At this time, the abutment face 22 of the metallic body 2 protrudes, by thickness of the metallic body 2, from the securing face 81 of the top plate portion 80. In this manner, the abutment face 22 of the metallic body 2 and the abutment face 35 of the board 3 easily come into contact with each other.

On the abutment face 22 of the metallic body 2 that is secured to the thermo conductive resin member 8, the abutment face 35 of the board 3 is adhesively bonded by a thermo conductive medium (such as a thermo conductive adhesive bond or a thermo conductive grease), although not shown, in a state in which these abutment faces are abutted against each other. As a result, the light emitting chips 40 to 44 is positioned at or near a center O of the thermo conductive resin member 8 via the board 3 (a center O of the socket portion 11). Thus, the light source portion 10 is mounted to the socket 11 in a state in which the light source portion comes into intimate contact with the metallic body 2.

(Power Feeding Members 91 to 93)

The electric power feeding members 91 to 93 are electrically connected to the light source portion 10 and then electric power is fed to the light source portion 10. One end parts of the electric power feeding members 91 to 93 (the end parts mounted to the board 3) are respectively made of straight pins. One end parts of the electric power feeding members 91 to 93 of the straight pins are disposed on one lateral straight line, and protrude from one end face of the insulation member 7 (the face opposite to the board 3). One end parts of the electric power feeding members 91 to 93 penetrate the board 3, and are electrically connected and mechanically mounted by the solder iron 62. It is to be noted that laser welding or the like may be carried out in place of the soldering 62.

Between one end face of the insulation member 7 in which the electric power feeding members 91 to 93 are integrally incorporated and the abutment face 35 of the board 3, a space 811 is provided as a part of the mounting through hole 803 of the thermo conductive resin member 8. The space 811 mitigates a stress in the XY direction (one end face of the insulation member 7, in the direction on the abutment face 35 of the board 3) acting on a site corresponding to one end part of the insulation member 7 among the electric power feeding members 91 to 93, or alternatively, a site corresponding to the abutment face 35 of the board 3 among the electric power feeding members 91 to 93

Among the electric power feeding members 91 to 93, a stress mitigating portion (not shown) formed in a lateral U-shape may be provided at a portion between one end face of the insulation member 7 and the abutment face 35 of the board 3. The stress mitigating portion mitigates a stress in the Z direction (one end face of the insulation member 7, in the perpendicular direction against the abutment face 35 of the board 3) acting on a portion between one end face of the insulation member 7 and the abutment face 35 of the board 3 among the electric power feeding members 91 to 93. The stress mentioned above is a stress which is generated between parts and members with different thermal expansion rates in change of the ambient temperature environment of the vehicle.

The other end parts of the electric power feeding members 91 to 93 (each of these end parts is opposite to an end part mounted to the board 3) are disposed on one straight line, and protrude from the other end of the insulation member 7 (an opposite face to a face opposed to the board 3). The other end parts of the electric power feeding members 91 to 93 constitute terminals 910, 920, 930 which are disposed on one straight line in the recessed portion 802 in the connector engagement portion 801 of the thermo conductive resin member 8 (hereinafter, there may be referred to as "910 to 930").

(Connector Portion 13 and Connector 14)

The connector engagement portion 801 as a part of the thermo conductive resin member 8 and the terminals 910 to 930 as a part of the electric power feeding members 91 to 93 constitute a connector portion 13. To the connector portion 13, a power supply side connector 14 is mounted mechanically removable and electrically intermittently.

As shown in FIG. 1, the connector 14 is connected to a power source (direct current power supply battery), although not shown, via harnesses 144, 145 and a switch (not shown). The connector 14 is earthed (grounded) via a harness 146. The connector portion 13 and the connector 14 are a connector portion and also a connector of three-pin type and water resistance structure (the three power feeding members 91 to 93, the three terminals 910 to 930, the three power supply side terminals).

The connector part 13 is provided at a lower side of the other end part of the socket portion 11 (an opposite end part to an end part at the side at which the light source portion 10 is mounted). That is, the connector portion 13 is positioned at a lower side when the vehicular lighting instrument 100 provided with the light source unit 1 is provided in the vehicle.

The connector engagement portion 801 surrounds the terminals 910 to 930 that are disposed on a lateral straight line. The connector engagement portion 801 forms a hollowed, elongated rectangular shape (refer to FIG. 16). At a lower edge and both of the left and right edges of the connector engagement portion 801, locking portions 812 are respectively provided. Inside of the connector engagement portion 801, the recessed portion 802 is formed.

On the other hand, the connector 14 forms a water resistance structure to double engage with the recessed portion 802 inside of the connection engagement portion 801 of the connector portion 13 and the outside of the connector engagement portion 801 of the connector portion 13. At a lower edge and both of the left and right of the connector 14, locking portions (not shown) are provided.

A first gap 808 is formed at a portion communicating with the connector engagement portion 801 of a respective one of the fin portions 89 at the center and both of the left and right sides of the thermo conductive resin member 8. Thus, it is possible to prevent an obstruction of the fin portions 89 at the time of engaging the connector 14 with the connector portion 13.

The cover portion 12 is made of an optically permeable member. At the cover portion 12, there is provided an optical control portion such as a prism (not shown) to optically control and emit the light from the five light emitting chips 40 to 44. The cover portion 12 is an optical part.

The cover portion 12, as shown in FIG. 1, is mounted to one end part (one end opening portion) of the socket portion 11 formed in a cylindrical shape so as to cover the light source portion 10. That is, at the cover portion 12, a guide portion (not shown) and a mounting portion (not shown) are provided. The guide portion of the cover portion 12 is guided by the guide protrusion portion 88 to prevent incorrect assembling of the thermo conductive resin member 8, and the mounting portion of the cover portion 12 is mounted to an edge of the mounting hole 87 of the thermo conductive resin member 8. As a result, the cover portion 12 is mounted to the board protection wall 85 of the thermo conductive resin member 8, and covers the light source portion 10.

The cover portion 12, together with the sealing member 180, precludes the five light emitting chips 40 to 44 from being affected by an external factor, for example, contact of another object, adherence of dust, and protects these chips from ultraviolet ray, sulfide gas, NOx, or water. That is, the cover portion 12 protects the five light emitting chips 40 to 44 from an external disturbance. Also, the cover portion 12 protects the control element and the wiring element and the electrical conductive adhesive bond other than the five light emitting chips 40 to 44 from an external disturbance. It is to be noted that on the cover portion 12, a ventilation hole (not shown) may be provided.

[Functions of Fourth Embodiment]

The light source unit 1 of the semiconductor light source of the vehicular lighting instrument in the fourth embodiment and the vehicular lighting instrument 100 in the fourth embodiment (hereinafter, referred to as "the light source unit 1 and the vehicular lighting instrument 100 in the fourth embodiment") are made of the constituent elements as described above, and hereinafter, functions thereof will be described.

First, an appropriate switch is operated so that a tail lamp is lit. Then, an electric current (a driving current) is supplied to one light emitting chip 40 of a tail lamp function through a control element and a wiring element of the tail lamp function. As a result, one light emitting chip 40 of the tail amp function emits light.

The light that is radiated from one light emitting chip 40 of the tail lamp function transmits the sealing member 180, a pneumatic air layer, and the cover portion 12 of the light source unit 1, and the light having thus transmitted is controlled to be optically distributed. It is to be noted that a part of the light that is radiated from the light emitting chip 40 is reflected at the cover portion 12 side on the high reflection surface 30 of the board 3. The optically distributed controlled light transmits the lamp lens 102 of the vehicular lighting instrument 100, is controlled to be optically distributed again, and is emitted to the outside. In this manner, the vehicular lighting instrument 100 emits light distribution of the tail lamp function to the outside.

Next, an appropriate switch is operated so that a stop lamp is lit. Then, an electric current (a driving current) is supplied to four light emitting chips 41 to 44 of the stop lamp function through a control element and a wiring element of the stop lamp function. As a result, the four light emitting chips 41 to 44 of the stop lamp function emit light.

The light that is radiated from the four light emitting chips 41 to 44 of the stop lamp function transmits the sealing member 180, the pneumatic air layer, and the cover portion 12 of the light source unit 1, and the light having thus transmitted is controlled to be optically distributed. It is to be noted that a part of the light that is radiated from the light emitting chips 41 to 44 is reflected at the cover portion 12 side on the high reflection surface 30 of the board 3. The optically distributed controlled light transmits the lamp lens 102 of the vehicular lighting instrument 100, the light having thus transmitted is controlled to be optically distributed again, and the thus controlled light is emitted to the outside. In this manner, the vehicular lighting instrument 100 emits light distribution of the stop lamp function to the outside. This light distribution of the stop lamp function is bright (large in terms of luminous flux, luminance, intensity of light, and luminous intensity) in comparison with the light distribution of the tail lamp function mentioned above.

Afterwards, an appropriate switch is operated so that the lamp goes out. Then, an electric current (a driving current) is shut out. As a result, the light from one light emitting chip 40 or the light from the four light emitting chips 41 to 44 goes out. In this manner, the light from the vehicular lighting instrument 100 goes out.

Here, the heat that is generated in the light emitting chips 40 to 44 of the light source portion 10 and a control element and a wiring element is transmitted to the thermo conductive resin member 8 via the substrate 3 and the thermo conductive medium and the metallic body 2 and the grease 21, and from the thermo conductive resin member 8, the transmitted heat is radiated to the outside.

That is, the heat that is transmitted to the top plate portion 80 of the thermo conductive resin member 8 is transmitted to the fin portions 89, the board protection wall 85, the jaw portion 804, the mounting portion 805, and the connector engagement portion 801, and the thus transmitted heat is radiated (emitted) to the outside from the surfaces of the fin portions 89, the board protection wall 85, the connector engagement portion 801, the jaw portion 804, and the mounting portion 805.

Also, a part of the teat that is transmitted to the fin portions 89 from the top plate portion 80 of the thermo conductive resin member 8 is generated as a convection heat in the through gap 800 of the thermo conductive resin member 8. The convection heat is discharged to the outside through an opening of an upper end part 89 from the through gap 800 of the thermo conductive resin member 8 as indicated by the solid line-contoured arrow in FIGS. 16 and 22.

It is to be noted that in a case where an inclined face 806 is provided at an upper part of a base portion between the top plate portion 80 and a respective one of the fin portions 89, the convection heat that is generated in the through gap 800 of the thermo conductive resin member 8 is discharged to the outside along the inclined face 806 at the upper part of the base portion between the top plate portion 80 and the respective one of the fin portions 89, as indicated by the arrow contoured by the double-dotted chain line in FIG. 22.

Further, a turbulence is generated by the fine irregularities on the exterior face of the thermo conductive resin member 8, that is, on the exterior faces of the fin portions 89, the board protection wall 85, the connector engagement portion 801, the jaw portion 804, and the mounting portion 805. Owing to the generation of the turbulence, the heat that is transmitted from the top plate 80 to the fin portions 89, the board protection wall 85, the connector engagement portion 801, the jaw portion 804, and mounting portion 805 is radiated (emitted) to the outside from the exterior faces of the fin portions 89, the board protection wall 85, the connector engagement portion 801, the jaw portion 804, and the mounting portion 805. Also, by the fine irregularities on the exterior face of the thermo conductive resin member 8, a radiation (emission) area is increased, and the resultant heat is efficiently radiated (emitted) to the outside accordingly.

[Advantageous Effects of Fourth Embodiment]

The light source unit 1 and the vehicular lighting instrument 100 in the fourth embodiment is made of the constituent elements and functions as described above, and hereinafter, advantageous effects thereof will be described.

In so far as a light source unit 1 and a vehicular lighting instrument 100 in the fourth embodiment is concerned, a thermo conductive resin member 8 and a metallic body 2 of a socket portion 11 are respectively molded separately, and the metallic body 2 is secured to the thermo conductive resin member 8. As a result, a process of manufacturing the thermo conductive resin member 8 and a process of securing the metallic body 2 to the thermo conductive resin member 8 can be carried out in parallel to each other and thus the manufacturing tact of the socket 11 can be reduced, and moreover, the manufacturing costs are saved, and the durability of a die can be improved.

In so far as the light source unit 1 and the vehicular lighting instrument 100 in the fourth embodiment is concerned, the metallic body 2 is secured in a state in which the metallic body comes into intimate contact with the thermo conductive resin member 8 via grease 21 which is thinly and uniformly drawn out. Thus, between the securing face 20 of the metallic body 2 and the securing face 81 of the top plate portion 80 of the thermo conductive resin member 8, there is no pneumatic air layer, and an intimate contact is established. In this manner, a thermal conductivity from the metallic body 2 to the thermo conductive resin member 8 is improved, and a heat radiation effect can be improved.

In so far as the light source unit 1 and the vehicular lighting instrument 100 in the fourth embodiment is concerned, a groove 84 formed in a circumferential shape which is smaller than an outer circumferential edge of the metallic body 2 is provided on the securing face 81 of the top plate portion 80 of the thermo conductive resin member 8. As a result, irrespective of whatsoever there may be an external factor such as an external environment change in a state in which the above lighting instrument is mounted to a vehicle or mechanical vibration, it is possible to prevent a leakage from the groove 84 to the outside of the grease 21 that is interposed between the securing face 20 of the metallic body 2 and the securing face 81 of the top plate 80 of the thermo conductive resin member 8.

In particular, as in the fourth embodiment, in a case where an avoidance recessed portion 23 is provided at an outer circumferential edge of the metallic body 2, and the shape of the outer circumferential end of the metallic body 2 is complicated, a securing rib 82 of the thermo conductive resin member 8 cannot be secured to the outer circumferential edge of the metallic body 2 all over its circumference. Thus, in the fourth embodiment, the securing rib 82 of the thermo conductive resin member 8 is partially swaged at three edges of the outer circumferential edge other than the avoidance recessed portion 23 of the metallic body 2. Here, in a case where the securing rib 82 is partially swaged at the outer circumferential edge of the metallic body 2 without providing the groove 84, there may be a case in which the grease 21 interposed between the securing face 20 of the metallic body 2 and the securing face 81 of the top plate 80 of the thermo conductive resin member 8 leaks to the outside. Therefore, the groove 84 formed in a circumferential shape which is smaller than the outer circumferential edge of the metallic body 2 is provided on the securing face 81 of the thermo conductive resin member 8, thereby making it possible to prevent the leakage from the groove 84 to the outside of the grease 21 that is interposed between the securing face 20 of the metallic body 2 and the securing face 81 of the top plate portion 80 of the thermo conductive resin member 8.

In so far as the light source unit 1 and the vehicular lighting instrument 100 in the fourth embodiment is concerned, at the thermo conductive resin member 8 and the metallic body 2, a positioning protrusion portion 83 and four corners of a positioning portion respectively provided to determine a mutual position. Thus, at the time of securing the metallic body 2 to the thermo conductive resin member 8, the thermo conductive resin member 8 and the metallic body 2 are positioned each other by the positioning protrusion portion 83 and the four corners of the positioning portion and thus the metallic body 2 can be secured at a correct position of the thermo conductive resin member 8.

In so far as the light source unit 1 and the vehicular lighting instrument 100 in the fourth embodiment is concerned, in respect of the gates of a molding die at the time of insert molding of the thermo conductive resin member 8, a one-point gate G1 is positioned at or near a center of the other end face of the thermo conductive resin member 8, that is, at or near the center of the other face of a central fin portion 89; and a two-point gate G2 is positioned at or near the other end face of the central fin portion 89, that is, on one straight line or one substantially straight line of one end face of a mounting portion 805. By these gates G1, G2, the flow direction of a resin containing carbon fiber for molding the thermo conductive resin member 8 (the direction as indicated by the solid line-contoured arrow of the gates G1, G2 in FIG. 17) is substantially coincident with a protrusion direction of the fin portions 89 in the fin portions 89, and also is substantially coincident with a facial direction of the top plate portion 80 in the top plate portion 80 (the direction that is substantially orthogonal to the solid line-contoured arrow of the gate G1, G2 in FIG. 17). As a result, a heat radiation route of the thermo conductive resin member 8 and a longitudinal direction of carbon fiber of the thermo conductive resin member 8 are substantially coincident with each other and thus the heat radiation efficiency can be improved.

In the one-point gate G1, as shown in FIGS. 16, 17, and 22, a second gap 809 is formed at a portion communicating with a connector engagement portion 801 of a central fin 89. Thus, in the flow of a resin containing carbon fiber, it is possible to prevent generation of the flow in a direction which is substantially orthogonal to a protrusion direction of the fin portion 89 via the connector engagement portion 801. In this manner, the flow of the resin containing carbon fiber is in the protrusion direction of the fin portion 89 and thus a heat radiation route in the fin portion 89 of the thermo conductive resin member 8 and a longitudinal direction of carbon fiber of the thermo conductive resin member 8 are substantially coincident with each other, and the heat radiation efficiency can be improved.

In so far as the light source unit 1 and the vehicular lighting instrument 100 in the fourth embodiment is concerned, a two-point gate G2 is positioned to be upper than the securing face 20 of the metallic body 2 at the time of molding of the thermo conductive resin member 8. Thus, at the time of molding of the thermo conductive resin member 8, the resin containing carbon fiber flows in the fin direction that is a heat radiation route, and therefore, the heat radiation efficiency can be maintained without lowering it.

In so far as the light source unit 1 and the vehicular lighting instrument 100 in the fourth embodiment is concerned, fin portions 89 positioned in a perpendicular direction and a through gap 800 as a gap are provided at the thermo conductive resin member 8 when the vehicular lighting instrument 100 provided with the light source unit 1 is provided in the vehicle. As a result, by the through gap 800 for generation of convection current in the perpendicular direction, a heat radiation effect of the thermo conductive resin member 8 is improved, and downsizing of the thermo conductive resin member 8 and downsizing of the light source unit 1 can be attained accordingly.

In so far as the light source unit 1 and the vehicular lighting instrument 100 in the fourth embodiment is concerned, the thermo conductive resin member 8 forms an exterior portion of the socket portion 11, and at the thermo conductive resin member 8, apart from the fin portions 89, there are provided: a mounting portion 805 and a jaw portion 804 for providing the light source unit 1 in the vehicular lighting instrument 100; and a board protection wall 85 to protect the board 3. As a result, a radiation area (an emission area) for atmospheric air of the thermo conductive resin 8 can be increased, and a heat radiation effect of the thermo conductive resin member 8 can be further improved accordingly. In this manner, downsizing of the thermo conductive resin member 8 and downsizing of the light source unit 1 can be attained.

Moreover, in so far as the light source unit 1 and the vehicular lighting instrument 100 in the fourth embodiment are concerned, a heat radiation effect of the thermo conductive resin member 8 can be further improved by a heat radiation action of the resin containing carbon fiber of the thermo conductive resin member 8 (by a heat emission action by which the emission coefficient of the resin containing carbon fiber is of the order of about 0.9).

In so far as the light source unit 1 and the vehicular lighting instrument 100 in the fourth embodiment are concerned, the thermo conductive resin member 8 forms an exterior portion of the socket portion 11, and fine irregularities are provided on the exterior face of the thermo conductive resin member 8, that is, on the exterior faces of the fin portions 89, the board protection wall 85, connector engagement portion 801, the jaw portion 804, and the mounting portion 805. As a result, turbulence (not shown) is generated by the fine irregularities 804 on the exterior face of the thermo conductive resin member 8, that is, on the exterior faces of the fin portions 89, the board protection wall 85, the jaw portion 804, and the mounting portion 805. Owing to the generation of the turbulence, the heat that is transmitted from the top plate portion 80 to the fin portions 89, the board protection wall 85, connector engagement portion 801, the jaw portion 804, and the mounting portion 805 is efficiently radiated (emitted) to the outside from the exterior faces of the fin portions 89, the board protection wall 85, the connector engagement portion 801, the jaw portion 804, and the mounting portion 805. Also, by the fine irregularities on the exterior face of the thermo conductive resin member 8, the radiation (emission) area is increased, and the resultant heat is efficiently radiated (emitted) to the outside accordingly. In this manner, downsizing of the thermo conductive resin member 8, that is, downsizing of the light source unit 1 can be attained.

[Examples Other than First, Second, Third, and Fourth Embodiments]

In the first, second, third, and fourth embodiments mentioned previously, five light emitting chips 40 to 44 were used. However, in the present invention, two to four or six or more light emitting chips may be employed. The quantity or layout of light emitting chips used as a tail lamp function and the quantity or layout of light emitting chips as a stop lamp function are not limited in particular. That is, a plurality of light emitting chips may be mounted in one line or on a circumference. Moreover, in a case where a plurality of light emitting chips are disposed on a circumference, there is no need to dispose a light emitting chip at the center of the circumference. Furthermore, in a case where two or more light emitting chips are disposed on a circumference, there is no need to dispose these chips at equal intervals.

Also, the first, second, third, and fourth embodiments mentioned previously were for use in a multifunctional lamp of a tail and a stop lamp. However, the present invention may also be for use in a multifunctional lamp as a combination lamp other than the multifunctional lamp of the tail and stop lamp. That is, a light emitting chip with a small amount of light emission from which a fine current is to be supplied and a light emitting chip with a large amount of light emission from which a mass current is to be supplied can be substituted by a subsidiary filament with its small amount of light emission and a main filament with its large amount of light emission.

Further, the first, second, third, and fourth embodiments mentioned previously were for use in a multifunctional lamp of a tail and a stop lamp. However, the present invention may also be for use in a single functional lamp. That is, a plurality of light emitting chips may be substituted by a single filament, and the substitute single filament can be used in a single functional lamp. Single functional lamps may be a turning signal lamp, a backup lamp, a stop lamp, a tail lamp, a low beam lamp as a headlamp (a headlamp for passing), a high beam lamp as a headlamp (a cruising headlamp); a fog lamp, a clearance lamp; a cornering lamp, and a daytime running lamp or the like.

Further, the first, second, third, and fourth embodiments mentioned previously were used to switch two lamps of a tail lamp and a stop lamp. However, the present invention can be used to switch three or more lamps, or alternatively, can also be used in a single lamp which does not carry out switching.

Furthermore, in the first, second, third, and fourth embodiments mentioned previously, a direction of mounting a power supply side connector 14 to connector portions 13, 13B and a direction of mounting light source units 1, 1A, 1B to a vehicular lighting instrument 100 were coincident with each other (were parallel to each other). However, in the present invention, a direction of mounting a power supply side connector 14 to connector portions 13, 13B and a direction of mounting light source units 1, 1A, 1B to a vehicular lighting instrument 100 may be crossing (orthogonal to) each other.

Still furthermore, in the first, second, third, and fourth embodiments mentioned previously, the power supply side connector 14 was engaged into the connector portions 13, 13B. However, in the present invention, a power supply side connector may be engaged outside of a connector portion, or alternatively, inside and outside of a connector.

Yet furthermore, in the first, second, third, and fourth embodiments mentioned previously, there was provided a reflection surface which is inclined outwardly from one end (a lower end) to the other end (an upper end) of an inner circumferential face of a wall portion of an surrounding wall member 18. However, in the present invention, a reflection surface may not be provided on an inner circumferential face of a wall portion of the surrounding wall member 18. In this case, an inner circumferential face of the wall portion of the surrounding wall member 18 may be a perpendicular face in place of an inclined face.

Furthermore, in the first, second, third, and fourth embodiments mentioned previously, a thickness of the wall portion of the surrounding wall member 18 (a thickness from the inner circumferential face to the outer circumferential face of the wall portion) was substantially uniform (equal). However, in the present invention, the thickness of the wall portion of the surrounding wall member 18 does not need to be substantially uniform.

Still furthermore, in the first, second, third, and fourth embodiments mentioned previously, the shape of the inner circumferential face of the wall portion of the surrounding wall member 18 was a circular shape, that is, a circular shape which is concentric to circumferences of four light emitting chips 41 to 44 as seen in the perpendicular direction with respect to the mounting face 34 of the board 3. However, in the present invention, the shape of the inner circumferential face of the wall portion of the surrounding wall member 18 may be an elliptical shape, or alternatively, a ellipse-based shape (that is, a shape in which curves at both end parts in a long-axial direction of a reference ellipse may be shifted to a center side of the reference ellipse). In this case, a plurality of light emitting chips may be disposed in one line in the long-axial direction of the ellipse or the reference ellipse.

Yet furthermore, in the first, second, third, and fourth embodiments mentioned previously, the thermo conductive resin member 8 was composed of at least an insert molded article of a resin containing carbon fiber. However, in the present invention, the thermo conductive resin member 8 may be composed of a resin free of carbon fiber, or alternatively, a resin free of carbon fiber and carbon granule.

Furthermore, in the fourth embodiment mentioned previously, a mutual position between the thermo conductive resin member 8 and the metallic body 2 was determined by four corners of the positioning protrusion portion 83 of the thermo conductive resin member 8 and the metallic body 2. However, in the present invention, in place of the positioning protrusion portion 83 and the four corners of the metallic body 2, the securing rib 82 of the thermo conductive resin member 8 and three edges of the metallic body 2 may be compatibly used as a positioning portion. In this case, a positioning portion in the avoidance recessed portion 23 of the metallic body 2 is required, Also, the positioning protrusion portion 83 and the four corners of the metallic body 2 and the securing rib 82 and the three edges of the metallic body 2 may be used together.

Still furthermore, in the fourth embodiment mentioned previously, the groove 84 was provided in the thermo conductive resin member 8. However, in the present invention, a groove may be provided in the metallic body 2, or alternatively, a groove may be provided in each of the thermo conductive resin member 8 and the metallic body 2.

Yet furthermore, in the fourth embodiment mentioned previously, the connector portion 13 as a water resistance connector was provided at a lower site of the thermo conductive resin member 8 of the socket 11 (at the lower site when the vehicular lighting instrument 100 provided with the light source unit 1 is provided in the vehicle). However, in the present invention, the connector portion 13 as a water resistance connector may be provided at a lateral site of the thermo conductive resin member 8 of the socket 11 (at the lateral site when the vehicular lighting instrument provided with the light source unit 1 is provided in the vehicle).

The invention claimed is:

1. A vehicular lighting instrument semiconductor light source light source unit, comprising:

a light source portion; and a socket portion to which the light source portion is mounted, wherein the light source portion having a light emitting chip of a semiconductor light source, the socket portion is comprised of:

a thermo conductive resin member to radiate to an outside of the light source portion a heat which is generated at the light source portion;

an electric power feeding member electrically connected to the light source portion, feeding electric power to the light source portion; and an insulation member to sheath at least a part of the electric power feeding member, and incorporate the thermo conductive resin member and the electric power feeding member in a state in which the members are insulated from each other, wherein the thermo conductive resin member forms a radially exterior portion of the socket portion.

2. The vehicular lighting instrument semiconductor light source light source unit according to claim 1, wherein a metallic body is provided at a site corresponding to the light source portion of the thermo conductive resin member.

3. The vehicular lighting instrument semiconductor light source light source unit according to claim 2, wherein the metallic body is secured in a state in which the metallic body comes into contact with the thermo conductive resin member via a thermo conductive medium.

4. The vehicular lighting instrument semiconductor light source light source unit according to claim 1, wherein fine irregularities are provided on a face coming into contact with at least the thermo conductive resin member of the metallic body, and the metallic body is insert molded in the thermo conductive resin member.

5. The vehicular lighting instrument semiconductor light source light source unit according to claim 4, wherein the thermo conductive resin member is comprised of an insert molded article of a thermo conductive resin.

6. The vehicular lighting instrument semiconductor light source light source unit according to claim 1, wherein a fin portion and a gap which are positioned in a vertical direction are provided at the thermo conductive resin member when a vehicular lighting instrument provided with a light source unit is provided in a vehicle.

7. The vehicular lighting instrument semiconductor light source light source unit according to claim 1, wherein a power supply side connector portion comprised of a part of the thermo conductive resin member and a part of the electric power feeding member is provided at the socket portion, a fin portion which is positioned in a perpendicular direction and a gap which opens at an upper part thereof are disposed at an upper part of the connector portion, when a vehicular lighting instrument provided with a light source unit is provided in a vehicle, and a fin portion which is positioned in a perpendicular direction and a vertically penetrating gap are disposed at a side part of the connector portion, when a vehicular lighting instrument provided with a light source unit is provided in a vehicle.

8. The vehicular lighting instrument semiconductor light source light source unit according to claim 1, wherein a mounting portion for providing a light source unit in a vehicular lighting instrument is provided at the thermo conductive resin member.

9. The vehicular lighting instrument semiconductor light source light source unit according to claim 1, wherein fine irregularities are provided on an exterior face of the thermo conductive resin member.

10. The vehicular lighting instrument semiconductor light source light source unit according to claim 1, wherein the thereto conductive resin member is comprised of an insert molded article of a thermo conductive resin, and a flow direction of the thermo conductive resin and a heat transmission direction are substantially coincident with each other.

11. The vehicular lighting instrument semiconductor light source light source unit according to claim 1, wherein a top plate portion of the thermo conductive resin member having the light source portion mounted to one face thereof is provided at the thermo conductive resin member, on the other face of the top plate portion of the thermo conductive resin member, a plurality of fin portions and gaps which are positioned in a vertical direction are provided when a vehicular lighting instrument provided with a light source unit is provided in a vehicle, a gate of a molding die at a time of insert molding the thermo conductive resin member is positioned at or near a center of an opposite face to a side to which the light source portion is mounted, a light source side connector portion comprised of a part of the thermo conductive resin member and a part of the electric power feeding member is provided at the socket portion, and a portion communicating with the connector portion is clipped from the fin portion at which the gate is positioned.

12. The vehicular lighting instrument semiconductor light source light source unit according to claim 1, wherein a top plate portion of the thermo conductive resin member having the light source portion on one face thereof is provided at the thermo conductive resin member, on the other face of the top plate portion of the thermo conductive resin member, a fin portion and a gap which are positioned in a vertical direction are provided when a vehicular lighting instrument provided with a light source unit is provided in a vehicle, a mounting portion for providing a light source unit in a vehicular lighting instrument is provided at the thermo conductive resin member, and the gate of the molding die at the time of insert molding of the thermo conductive resin member is positioned at a respective one of two sites on one straight line or one substantially straight line of an end face of the mounting portion.

13. The vehicular lighting instrument semiconductor light source light source unit according to claim 1, wherein a top plate portion of the thermo conductive resin member having the light source portion on one face thereof is provided at the thermo conductive resin member, and a metallic body is provided at the top plate portion.

14. The vehicular lighting instrument semiconductor light source light source unit according to claim 1, wherein the socket portion further comprises a metallic body which is molded separately from the thermo conductive resin member, which is secured to the thermo conductive resin member, and with which the light source portion is brought into contact.

15. The vehicular lighting instrument semiconductor light source light source unit according to claim 14, wherein, at the thermo conductive resin member and the metallic body, positioning portions to determine a mutual position are respectively provided.

16. A vehicular lighting instrument which employs a semiconductor light source as a light source, comprising:

a lamp housing and a lamp lens to partition a lamp room; and the vehicular lighting instrument semiconductor light source light source unit according to claim 1, which is disposed in the lamp room.

17. A vehicular lighting instrument semiconductor light source light source unit, comprising:

a light source portion; and a socket portion to which the light source portion is mounted, wherein the light source portion having a light emitting chip of a semiconductor light source, the socket portion is comprised of:

a thermo conductive resin member to radiate to an outside of the light source portion a heat which is generated at the light source portion;

an electric power feeding member electrically connected to the light source portion, feeding electric power to the light source portion; and an insulation member to sheath at least a part of the electric power feeding member, and incorporate the thermo conductive resin member and the electric power feeding member in a state in which the members are insulated from each other, a top plate portion of the thermo conductive resin member having the light source portion on one face thereof is provided at the thermo conductive resin member, on the other face of the top plate portion of the thermo conductive resin member, a fin portion and a gap which are positioned in a vertical direction are provided when a vehicular lighting instrument provided with a light source unit is provided in a vehicle, a circular ring-shaped protective wall of the thermo conductive resin member surrounding the light source portion is provided on one face of the top plate portion of the thermo conductive resin member, and a gate of a molding die at the time of insert molding of the thermo conductive resin member is positioned at a respective one of two sites on one straight line or one substantially straight line on an end face of the protection wall.

18. A vehicular lighting instrument semiconductor light source light source unit, comprising:

a light source portion; and a socket portion to which the light source portion is mounted, wherein the light source portion having a light emitting chip of a semiconductor light source, the socket portion is comprised of:

a thermo conductive resin member to radiate to an outside of the light source portion a heat which is generated at the light source portion;

an electric power feeding member electrically connected to the light source portion, feeding electric power to the light source portion; and an insulation member to sheath at least a part of the electric power feeding member, and incorporate the thermo conductive resin member and the electric power feeding member in a state in which the members are insulated from each other, the socket portion further comprises a metallic body which is molded separately from the thermo conductive resin member, which is secured to the thermo conductive resin member, and with which the light source portion is brought into contact, wherein an avoidance recessed portion to avoid the electric power feeding member is provided at an outer circumferential edge of the metallic body, a plurality of securing portions which are swaged at an outer circumferential edge other than the avoidance recessed portion of the metallic body, and which secures the metallic body, are provided at the thermo conductive resin member, and on at least either one of a securing face of the thermo conductive resin member and a securing face of the metallic body to secure each other, a groove is provided in a circumferential shape which is smaller than an outer circumferential edge of the metallic body.

* * * * *